US007341513B2

(12) United States Patent
Cuddy et al.

(10) Patent No.: US 7,341,513 B2
(45) Date of Patent: Mar. 11, 2008

(54) GAMING DEVICE HAVING MATCH GAME WITH AWARD DETERMINED BY PREDICTION OF CORRECT MATCHES

(75) Inventors: Ryan W. Cuddy, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 850 days.

(21) Appl. No.: 10/651,371

(22) Filed: Aug. 28, 2003

(65) Prior Publication Data

US 2005/0049038 A1 Mar. 3, 2005

(51) Int. Cl.
*A63F 13/00* (2006.01)

(52) U.S. Cl. ............................ 463/20; 463/21; 463/25

(58) Field of Classification Search ................. 463/20, 463/1; 434/322

See application file for complete search history.

(56) References Cited

U.S. PATENT DOCUMENTS 3,819,186 A 6/1974 Hinterstock
3,825,255 A 7/1974 Kennard et al.
4,448,419 A 5/1984 Telnaes
4,508,353 A 4/1985 Meyer et al.
4,582,324 A 4/1986 Koza et al.
4,624,459 A 11/1986 Kaufman
4,695,053 A 9/1987 Vazquez, Jr. et al.
4,732,386 A 3/1988 Rayfiel
4,775,155 A 10/1988 Lees
4,836,546 A 6/1989 Di Re et al.
5,035,422 A * 7/1991 Berman ....................... 463/18
5,035,625 A * 7/1991 Munson et al. ............. 434/332
5,072,946 A 12/1991 Miller
5,154,420 A 10/1992 Gutknecht
5,205,555 A 4/1993 Hamano
5,324,041 A 6/1994 Boylan et al.
5,342,047 A 8/1994 Heidel et al.
5,393,057 A 2/1995 Marnell, II
5,401,024 A * 3/1995 Simunek ...................... 463/18
5,407,200 A 4/1995 Zalabak
5,411,271 A 5/1995 Mirando
5,423,539 A 6/1995 Nagao
5,449,173 A 9/1995 Thomas et al.
5,501,455 A 3/1996 Hirata et al.
5,524,888 A 6/1996 Heidel (Continued)

FOREIGN PATENT DOCUMENTS

AU 199716432 B2 9/1997

(Continued)

OTHER PUBLICATIONS www.predictthepremiership.com—Predict the premiership—dated through Archive.org—note the rules.

(Continued)

*Primary Examiner*—John M. Hotaling, II
(74) *Attorney, Agent, or Firm*—Bell, Boyd & Lloyd LLP

(57) ABSTRACT

A gaming device having a game which includes a predicted number of matches, and an actual number of matches. An award is provided to the player that is based on the absolute value of the difference between the predicted number of matches and the actual number of matches.

56 Claims, 24 Drawing Sheets

U.S. PATENT DOCUMENTS

| | | | | |
|---|---|---|---|---|
| 5,536,016 | A | 7/1996 | Thompson | |
| 5,542,669 | A | 8/1996 | Charron et al. | |
| 5,560,603 | A | 10/1996 | Seelig et al. | |
| 5,611,535 | A | 3/1997 | Tiberio | |
| 5,611,730 | A | 3/1997 | Weiss | |
| 5,639,089 | A | 6/1997 | Matsumoto et al. | |
| 5,641,730 | A | 6/1997 | Brown | |
| 5,645,486 | A | 7/1997 | Nagao et al. | |
| 5,647,798 | A | 7/1997 | Falciglia | |
| 5,664,998 | A | 9/1997 | Seelig et al. | |
| 5,722,891 | A | 3/1998 | Inoue | |
| 5,732,948 | A | 3/1998 | Yoseloff | |
| 5,755,619 | A | 5/1998 | Matsumoto et al. | |
| 5,769,716 | A | 6/1998 | Saffari et al. | |
| 5,772,509 | A | 6/1998 | Weiss | |
| 5,788,573 | A | 8/1998 | Baerlocher et al. | |
| 5,797,794 | A * | 8/1998 | Angell | 463/18 |
| 5,823,872 | A | 10/1998 | Prather et al. | |
| 5,823,874 | A | 10/1998 | Adams | |
| 5,833,537 | A | 11/1998 | Barrie | |
| 5,848,932 | A | 12/1998 | Adams | |
| 5,851,148 | A | 12/1998 | Brune et al. | |
| 5,855,514 | A | 1/1999 | Kamille | |
| 5,882,261 | A | 3/1999 | Adams | |
| 5,910,046 | A | 6/1999 | Wada et al. | |
| 5,911,418 | A | 6/1999 | Adams | |
| 5,919,088 | A | 7/1999 | Weiss | |
| 5,919,091 | A | 7/1999 | Bell et al. | |
| 5,927,714 | A | 7/1999 | Kaplan | |
| 5,928,081 | A | 7/1999 | Bochichio et al. | |
| 5,935,002 | A | 8/1999 | Falciglia | |
| 5,944,314 | A | 8/1999 | Stavinsky | |
| 5,947,820 | A | 9/1999 | Morro et al. | |
| 5,951,397 | A | 9/1999 | Dickinson | |
| 5,954,336 | A | 9/1999 | Goossens et al. | |
| 5,971,849 | A | 10/1999 | Falciglia | |
| 5,976,015 | A | 11/1999 | Seelig et al. | |
| 5,980,384 | A | 11/1999 | Barrie | |
| 5,984,781 | A | 11/1999 | Sunaga | |
| 5,988,643 | A | 11/1999 | Awada | |
| 5,989,121 | A | 11/1999 | Sakamoto | |
| 5,996,997 | A | 12/1999 | Kamille | |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,019,369 | A | 2/2000 | Nakagawa et al. | |
| 6,033,307 | A | 3/2000 | Vancura | |
| 6,056,642 | A | 5/2000 | Bennett | |
| 6,059,289 | A | 5/2000 | Vancura | |
| 6,059,658 | A | 5/2000 | Mangano et al. | |
| 6,071,192 | A | 6/2000 | Weiss | |
| 6,089,976 | A | 7/2000 | Schneider et al. | |
| 6,089,977 | A | 7/2000 | Bennett | |
| 6,089,978 | A | 7/2000 | Adams | |
| 6,093,102 | A | 7/2000 | Bennett | |
| 6,102,798 | A | 8/2000 | Bennett | |
| 6,120,376 | A * | 9/2000 | Cherry | 463/16 |
| 6,120,377 | A | 9/2000 | McGinnis, Sr. et al. | |
| 6,126,542 | A | 10/2000 | Fier | |
| 6,129,355 | A | 10/2000 | Hahn et al. | |
| 6,135,882 | A | 10/2000 | Kadlic | |
| 6,135,884 | A | 10/2000 | Hedrick et al. | |
| 6,142,873 | A | 11/2000 | Weiss et al. | |
| 6,142,874 | A | 11/2000 | Kodachi et al. | |
| 6,142,875 | A | 11/2000 | Kodachi et al. | |
| 6,146,271 | A | 11/2000 | Kadlic | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,164,652 | A | 12/2000 | Lauretta et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,234 | B1 | 1/2001 | Seibert, Jr. et al. | |
| 6,174,235 | B1 | 1/2001 | Walker et al. | |
| 6,179,711 | B1 | 1/2001 | Yoseloff | |
| 6,186,894 | B1 | 2/2001 | Mayeroff | |
| 6,190,255 | B1 | 2/2001 | Thomas et al. | |
| 6,224,483 | B1 | 5/2001 | Mayeroff | |
| 6,227,969 | B1 | 5/2001 | Yoseloff | |
| 6,227,971 | B1 | 5/2001 | Weiss | |
| 6,231,442 | B1 | 5/2001 | Mayeroff | |
| 6,234,897 | B1 | 5/2001 | Frohm et al. | |
| 6,238,288 | B1 | 5/2001 | Walker et al. | |
| 6,261,177 | B1 | 7/2001 | Bennett | |
| 6,296,568 | B1 | 10/2001 | Tracy | |
| 6,299,165 | B1 | 10/2001 | Nagano | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,663 | B1 | 11/2001 | Sakamoto | |
| 6,315,664 | B1 | 11/2001 | Baerlocher et al. | |
| 6,322,309 | B1 | 11/2001 | Thomas et al. | |
| 6,328,649 | B1 * | 12/2001 | Randall et al. | 463/20 |
| 6,334,814 | B1 | 1/2002 | Adams | |
| 6,336,860 | B1 | 1/2002 | Webb | |
| 6,340,158 | B2 | 1/2002 | Pierce et al. | |
| 6,346,043 | B1 | 2/2002 | Colin et al. | |
| 6,347,996 | B1 | 2/2002 | Gilmore et al. | |
| 6,398,218 | B1 | 6/2002 | Vancura | |
| 6,398,220 | B1 | 6/2002 | Inoue | |
| 6,406,369 | B1 | 6/2002 | Baerlocher et al. | |
| 6,413,160 | B1 | 7/2002 | Vancura | |
| 6,416,408 | B2 * | 7/2002 | Tracy et al. | 463/16 |
| 6,419,579 | B1 | 7/2002 | Bennett | |
| 6,425,824 | B1 * | 7/2002 | Baerlocher et al. | 463/16 |
| 6,435,511 | B1 | 8/2002 | Vancura et al. | |
| 6,439,995 | B1 * | 8/2002 | Hughs-Baird et al. | 463/20 |
| 6,454,651 | B1 | 9/2002 | Yoseloff | |
| 6,471,208 | B2 | 10/2002 | Yoseloff et al. | |
| 6,481,713 | B2 | 11/2002 | Perrie et al. | |
| 6,506,118 | B1 | 1/2003 | Baerlocher et al. | |
| 6,514,141 | B1 | 2/2003 | Kaminkow et al. | |
| 6,547,242 | B1 | 4/2003 | Sugiyama et al. | |
| 6,565,084 | B1 | 5/2003 | Katz et al. | |
| 6,602,135 | B1 | 8/2003 | Gerrard | |
| 6,607,438 | B2 | 8/2003 | Baerlocher et al. | |
| 6,638,164 | B2 * | 10/2003 | Randall et al. | 463/20 |
| 6,692,354 | B2 * | 2/2004 | Tracy et al. | 463/16 |
| 6,719,630 | B1 | 4/2004 | Seelig et al. | |
| 6,746,328 | B2 | 6/2004 | Cannon et al. | |
| 6,761,353 | B2 | 7/2004 | Berman et al. | |
| 6,971,954 | B2 * | 12/2005 | Randall et al. | 463/20 |
| 2002/0025847 | A1 | 2/2002 | Thomas et al. | |
| 2002/0034974 | A1 | 3/2002 | Wood et al. | |
| 2002/0187827 | A1 | 12/2002 | Blankstein | |
| 2003/0104852 | A1 | 6/2003 | Duhamel | |
| 2003/0181234 | A1 | 9/2003 | Falciglia | |
| 2003/0216168 | A1 * | 11/2003 | Cannon et al. | 463/25 |

FOREIGN PATENT DOCUMENTS

| | | | |
|---|---|---|---|
| AU | A-50327/96 | | 10/1997 |
| AU | A-63553/98 | | 10/1998 |
| EP | 0 281 402 | | 9/1988 |
| EP | 0 449 433 | A2 | 2/1991 |
| EP | 0 798 676 | A1 | 10/1997 |
| EP | 0 945 837 | A2 | 9/1999 |
| GB | 2 105 891 | | 3/1983 |
| GB | 2 117 155 | | 10/1983 |

| | | | |
|---|---|---|---|
| GB | 2 137 392 | A | 10/1984 |
| GB | 2 222 712 | | 3/1990 |
| GB | 2258334 | A | 3/1993 |
| GB | 2 262 642 | | 6/1993 |
| GB | 2 328 311 | B | 2/1999 |
| GB | 2 335 524 | | 9/1999 |
| NZ | 508626 | A | 10/2001 |
| WO | WO 97/32285 | | 9/1997 |
| WO | WO 98/00207 | | 1/1998 |
| WO | WO 98/14251 | | 4/1998 |
| WO | WO 00/12186 | | 3/2000 |
| WO | WO 02/017250 | A2 | 2/2002 |

OTHER PUBLICATIONS

United Kingdom Search Report dated Jan. 25, 2005.
Beer Game: High-Low Description, printed from reelbeer.com (website) on May 3, 2001.
Bingo Game Advertisement, written by Casino Data System, published in 1998.
Clue Advertisement published by Mikohn in 2002.
Clue—Most Wanted Advertisement published by Mikohn in 2003.
Double Up Poker Game Description written by IGT, available prior to 2000.
High-Low Card Game Description, printed from math.hws.edu (website) on Aug. 2, 2004.
High-Low Card Game Description, printed from www.geocities.com (website) on Aug. 2, 2004.
In Between Game Description IGT, available prior to 2000.
Run for Your Money Brochure, IGT, 1998.
Top Dollar Brochure written by IGT, published in 1998.
Trivial Pursuit Advertisement published by Mikohn in 2003.
Unusual Suspects—Clue Advertisement published by Mikohn in 2003.

* cited by examiner

GAMING DEVICE HAVING MATCH GAME WITH AWARD DETERMINED BY PREDICTION OF CORRECT MATCHES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to a gaming device having a match game wherein the outcome such as the award is based on a prediction of correct matches.

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

In certain gaming devices, gaming device manufacturers provide excitement to players by using multipliers. A multiplier increases the award amount proportionally to the value of the multiplier. For example, a "2×" multiplier pays twice the normal award value. A "3×" multiplier pays three times the normal award value. A multiplier can substantially increase a player's award. Some games also employ an incrementing multiplier as described in the following paragraphs.

U.S. Pat. No. 6,004,207 discloses a slot machine that provides a multiplied payout when certain symbols or symbol combinations appear on the reels and a player bets the maximum amount of coins. This bonus game includes a plurality of reels including several symbols on the reels and a multiplier. The symbols include multiplier symbols and Power Point symbols. Initially, the bonus game sets the multiplier at a predetermined level. The multiplier increments by one level when the player obtains ten Power Point symbols on the reels from one or more spins. After the multiplier increases in value, the player needs ten more Power Point symbols to increment the multiplier again. The gaming device also enables a player to spin the reels to obtain a winning symbol combination. If the player obtains a winning combination, the gaming device provides the player with an award. If the winning combination includes a multiplier symbol, the award is multiplied by the multiplier. Once an award is multiplied by the multiplier, the multiplier resets to a predetermined level.

Another type of bonus game that includes a multiplied payout is the GOOD TIMES® gaming device which is manufactured by the assignee of this patent application and described in U.S. Pat. No. 6,328,649 This game includes three reels having a plurality of symbols and blank spaces. The symbols include a plurality of "Good Times" symbols.

The bonus includes two different multiplier groups. A first multiplier group starts at "1×" (or one times the award) and goes up to "12×" (or twelve times the award). The second multiplier group starts at "1×" and goes up to "144×" (or one hundred forty-four times the award). Each time a player spins the reels and obtains three blank spaces on a payline, the designated multiplier in each multiplier increments one level. When the player obtains a winning combination, the player receives an award. If a "Good Times" symbol appears in the winning combination, the player's award is multiplied by the designated multiplier in the first bonus table. If two "Good Times" symbols appear in the winning combination, the player's award is multiplied by the designated multiplier in the second bonus group.

Gaming devices that increase the opportunities to obtain awards and increase the size of the awards are desirable. Players are attracted to games that provide several larger awards and the opportunity to obtain a very large award. Therefore, to increase player enjoyment and excitement, it is desirable to provide new games for gaming devices.

SUMMARY OF THE INVENTION

The present invention relates to a gaming machine, and more specifically in one embodiment to a gaming machine having a match game with an outcome such as an award based on a prediction of correct matches and the actual number of correct matches. In one embodiment, the game begins when the player has achieved a qualifying condition in a base game operable upon a wager. The gaming device first causes the determination of the predicted number of matches such as through a first game sequence. The gaming device determines the actual number of matches through a second sequence such as a matching sequence. The gaming device determines the difference between the predicted number of matches and the actual number of matches. The game uses the absolute value of the difference between the predicted number of matches and the actual number of matches to determine or generate an award. In an alternate embodiment, the gaming device causes the determination of the actual number of matches and then the predicted number of matches. In further alternative embodiments, the successful events can be employed to determine the awards in addition to the matches as discussed below.

In one embodiment, the game is a bonus game of a wagering gaming device. In this embodiment, the gaming device allows the player to win credits in a bonus round. This type of gaming device automatically begins the bonus round when the player has achieved a qualifying condition. The qualifying condition can be a particular arrangement of indicia on a display device in a primary game. In another embodiment, the game is implemented as a primary game.

In one embodiment, to cause the determination of the predicted number of matches, the gaming device presents a game sequence which includes a plurality of selections to the player. In this embodiment, each of the selections corresponds to a different predicted number of matches which are initially hidden from the player. In one embodiment, the predicted number of matches are randomly associated with the selections. After the player has made a selection, the gaming device reveals the predicted number of matches associated with the player's picked selection. The gaming device also reveals the predicted number of matches associated with the selections that were not chosen. The selected predicted number of matches represents the number of correct matches that the player will attempt to achieve in the matching sequence. It should be appreciated that any suitable alternative methods, sequences and games or sub-games can be employed to determine the predicted number of matches.

For instance, in another embodiment, to cause the determination of the predicted number of matches, the gaming device displays a plurality of numbers to the player. In this embodiment, each number corresponds to a different predicted number of matches. Unlike the previous embodiment, the predicted number of matches are initially visible to the player. This feature allows the player to guess the outcome of the subsequent matching sequence and select a predicted number of matches corresponding to his or her guess. After the player has made a selection, the gaming device highlights the predicted number of matches associated with the player's selection. This predicted number of matches represents the number of correct matches that the player will attempt to achieve in the subsequent matching sequence.

In another embodiment, to cause the determination of the predicted number of matches, the gaming device presents a plurality of selections to the player. Each selection corresponds to a different predicted number of matches. Even after the player makes a selection, the predicted number of matches remains hidden until the end of the matching sequence. Only at the end of the matching sequence will the player learn the predicted number of matches.

In another embodiment, to cause the determination of the predicted number of matches, the gaming device presents a plurality of selections. Each selection corresponds to a predicted number of matches and a multiplier. The multipliers may be randomly determined or selected from a pool, and will modify the total award. The gaming device reveals the value of the selected predicted number of matches and the multiplier. This embodiment provides added excitement to the player given the possibility of obtaining a very large multiplier. As indicated above, the predicted number of matches can be determined in any other suitable manner.

In one embodiment, the gaming device causes the determination of the actual number of matches by providing a matching sequence which includes a series of questions, each question having a plurality of possible answer choices. The gaming device enables the player to choose among the plurality of answer choices. If the player's answer choice matches the predetermined answer, then the gaming device recognizes a correct match, accumulates the correct match, increments the correct matches display, and displays a prize value to the player. If the match is incorrect, then the gaming device may display a consolation prize value to the player. The gaming device presents additional questions to the player, until a termination condition occurs. The termination condition can be a limited number of questions or other suitable terminating event or events. Upon satisfying the termination condition, the total number of correct matches is the actual number of matches. In one embodiment, the number of available selections or answers increases with each round of the matching sequence. This also decreases the probability that the player will select a correct match. In this embodiment, the value of the prize for a correct match preferably increases as the number of selections or answers increase. This will increase player enjoyment by offering larger prize values. It should be appreciated that any suitable alternative methods, sequences and games or sub-games can be employed to determine the actual number of matches.

For instance, in another embodiment, the gaming device causes the determination of the actual number of matches by providing a matching sequence whereby the player can make two selections from a plurality of selections. The selections correspond to a plurality of different indicia, and each indicia occurs twice within the plurality of selections. If both of the player's selections contain the same indicia, then the gaming device recognizes a correct match, accumulates the correct match, increments the correct matches display and displays a prize value to the player. If the match is incorrect, then the gaming device may display a consolation prize value to the player. If a correct match is made, the gaming device deactivates those selections from the plurality of selections. Consequently, the number of possible selections in the next matching attempt decreases by two. Therefore, with every successful match, the probability of obtaining a subsequent correct match increases, boosting the level of enjoyment and overall excitement for the player. The gaming device provides the player with a plurality of attempts to make matches. The total number of correct matches is the actual number of matches. The matching sequence ends when a termination condition is reached.

In one embodiment, after the matching sequence, the gaming device determines the absolute value of the difference between the predicted number of matches and the actual number of matches. The absolute value of this difference can be viewed as the error between the player's goal or predicted number of matches and the actual number of correct matches.

In one embodiment, the gaming device determines the award based on a constant multiplier and the absolute value of the difference between the predicted number of matches and the actual number of matches. In one embodiment, the constant multiplier is 4×. At the conclusion of the matching sequence, the initial multiplier is reduced by the absolute value of the difference between the predicted number of matches and the actual number of matches. For example, if the absolute value of the difference between the predicted number of matches and the actual number of matches is two, then the multiplier would be reduced from 4× to 2×. In one embodiment, the total award provided to the player is equal to the product of the multiplier and the sum of the prize values obtained during the matching sequence. Therefore, in the embodiment, it is generally in the player's best interest to minimize the difference between the predicted number of matches and the actual number of matches. For example, if the player has a predicted number of matches equal to one, and the player has already achieved one match, then any additional matches would have the effect of reducing the multiplier. However, by avoiding a correct match, the player would be foregoing any prize value associated with that particular round of the matching sequence. In certain embodiments, this aspect of the gaming device introduces certain player strategy and a certain level of control that increases the enjoyment and the overall excitement level. For example, in a knowledge or skill based game or partial knowledge or skill based game, the game can compensate for a player who lacks the knowledge of a category (such as mathematics) or a skill by predicting a low or relatively low number of matches.

In another embodiment, the gaming device determines the award based on a variable multiplier and the absolute value of the difference between the predicted number of matches and the actual number of matches. In this embodiment, the multiplier is randomly determined, or selected from a pool, which adds player excitement given the opportunity to achieve a very large multiplier value. In this embodiment, the initial multiplier is reduced by the absolute value of the difference between the predicted number of matches and the actual number of matches. The total award is equal to the product of the multiplier and the sum of the prize values obtained during the matching sequence. In the alternative embodiments, the absolute value of the difference could be used to increased a multiplier or other modifier.

In another embodiment, the gaming device determines the difference between a first number and a second number. In this embodiment, the gaming device does not provide one or both of the prediction or matching sequences. In one such embodiment, the gaming device allows the player to select twice from a plurality of selections, each selection corresponding to one of the numbers. The first selection is the predicted number. The second selection is the actual number. In another embodiment, the gaming device randomly determines one or more of the numbers wherein the numbers correspond to the predicted number and the actual number. In each embodiment the gaming device calculates the absolute value of the difference between the predicted number and the actual number and bases an outcome on such absolute value. It should thus be appreciated that both the first or predicted number and the second or match number can be determined in any suitable manner. It should also be appreciated that more than one predicted number and/or more than one actual number may be suitably employed to determine the outcome such as the award.

Additional features and advantages of the present invention are described in, and will be apparent from, the following Detailed Description of the Invention and the Figures.

DETAILED DESCRIPTION OF THE INVENTION

General

Figure 1A:
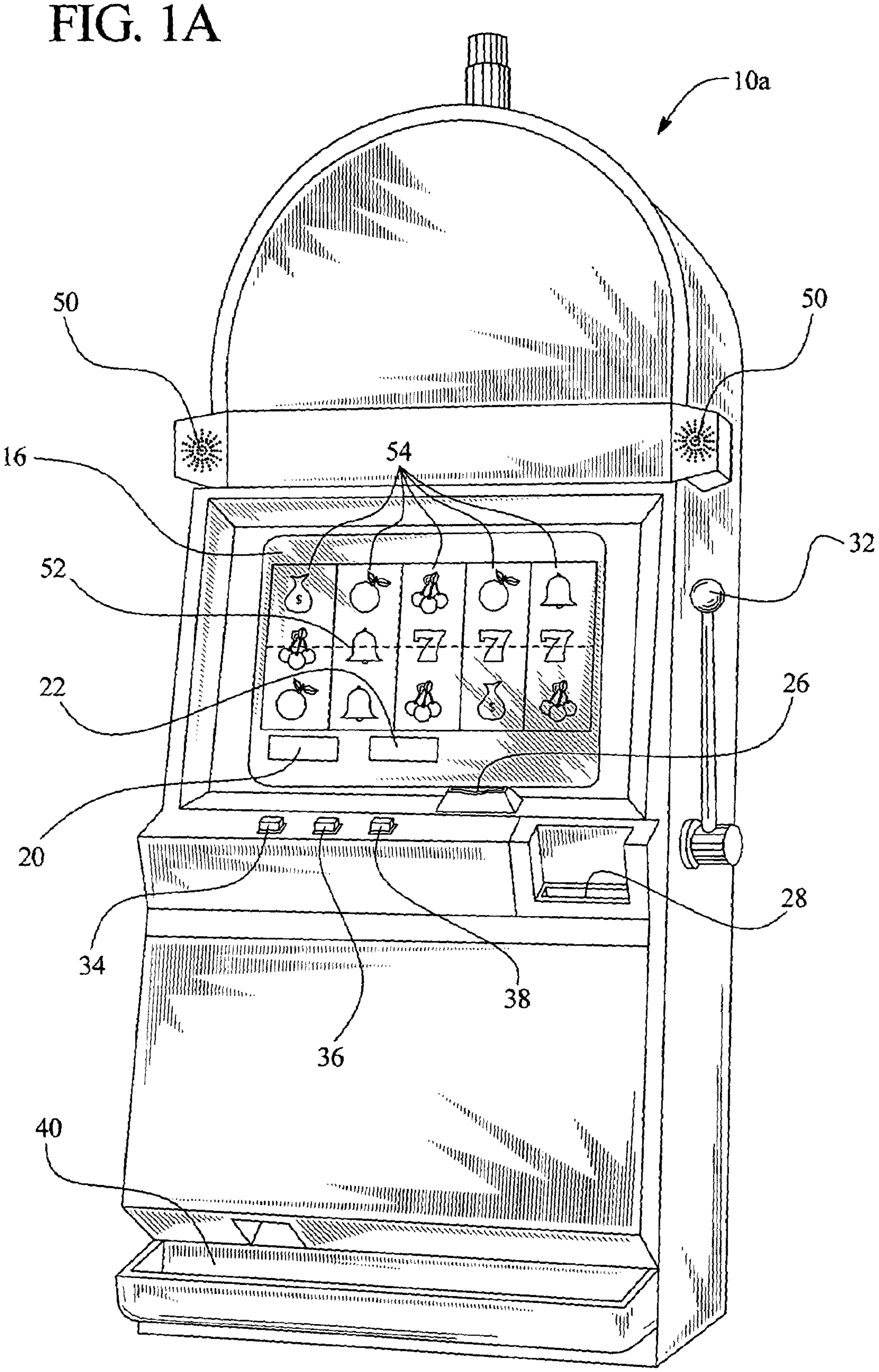
FIG. 1A is a front perspective view of one embodiment of the gaming device of the present invention.
Figure 1B:
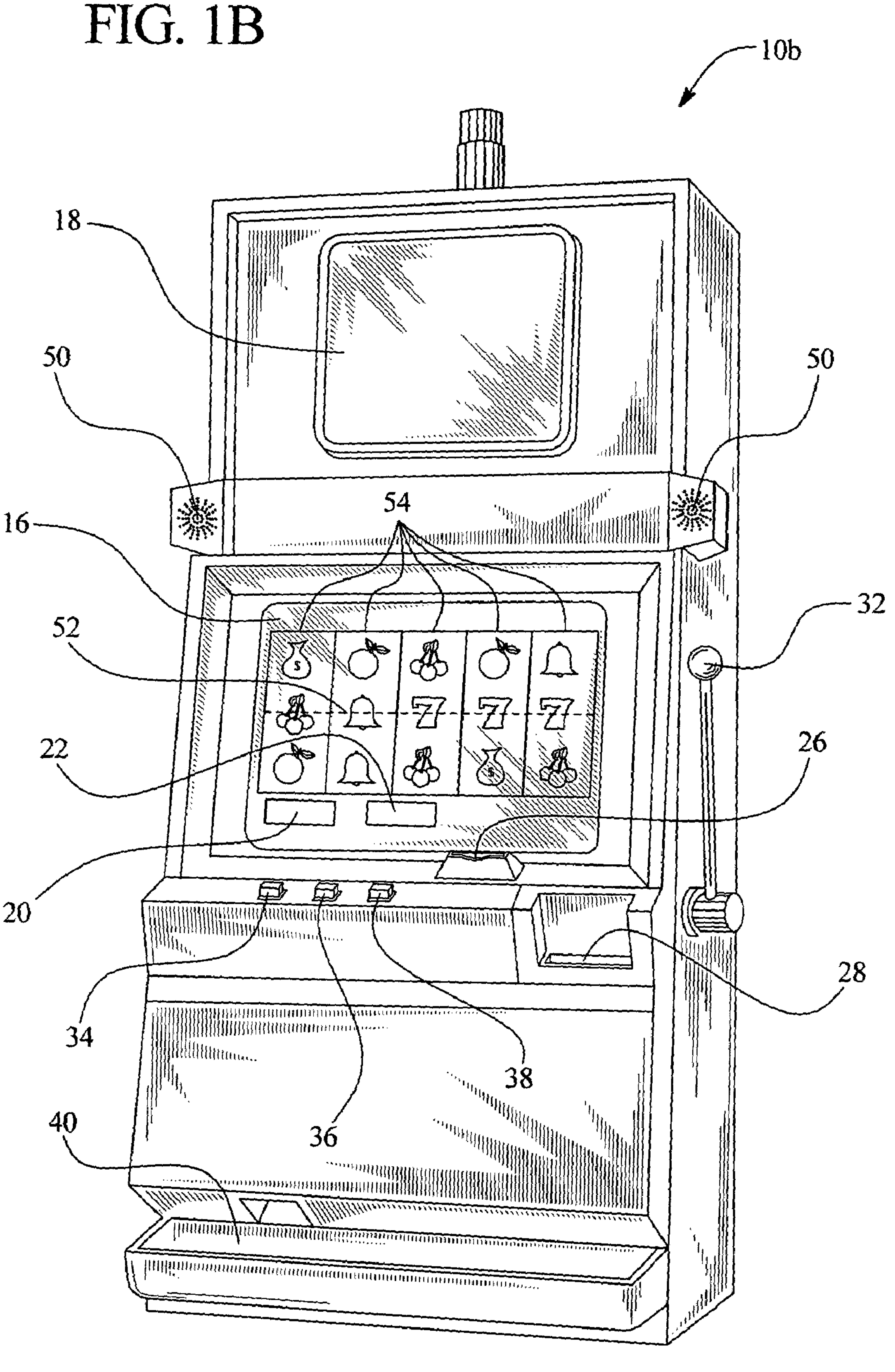
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
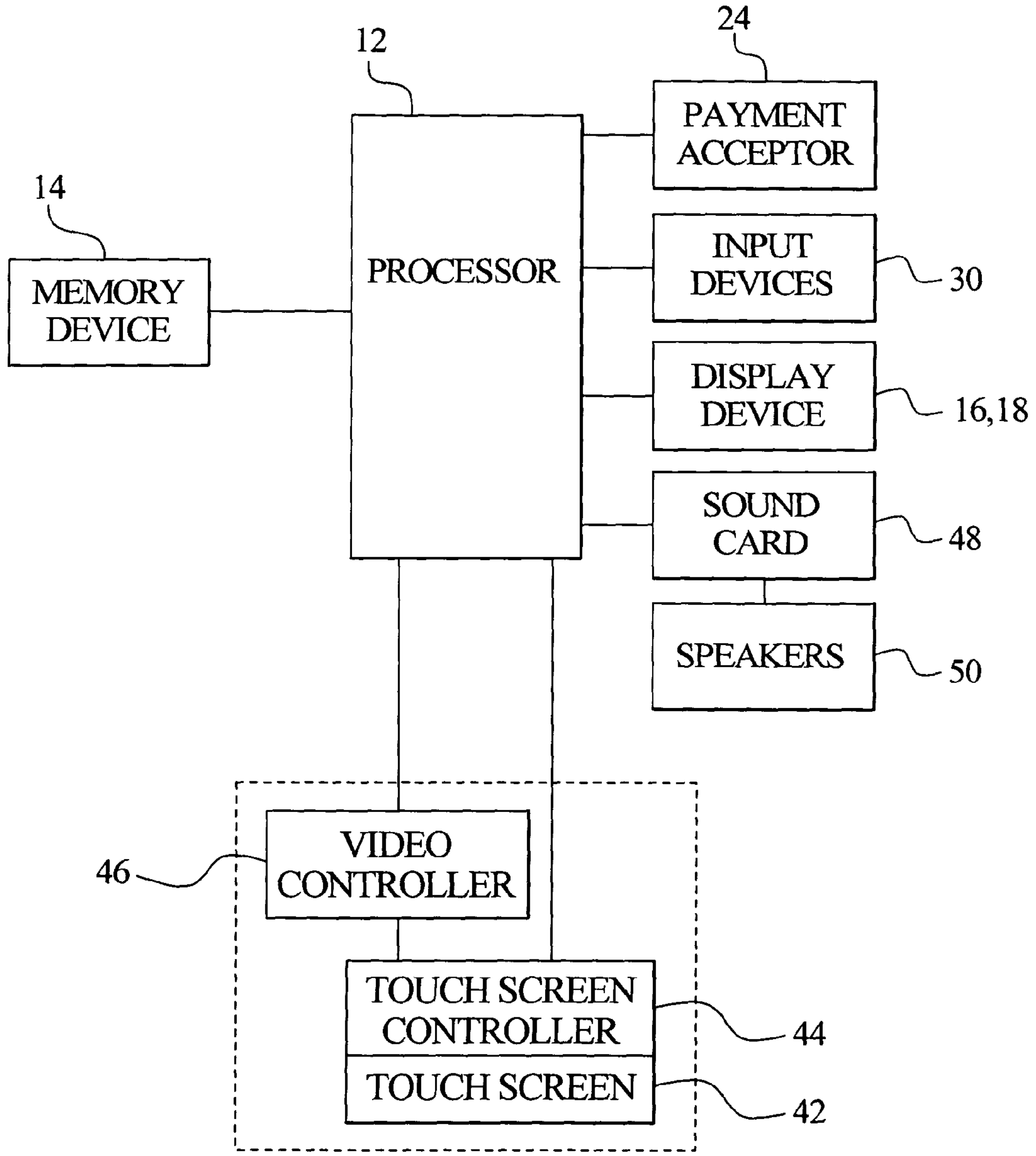
FIG. 2A is a schematic block diagram of the electronic configuration of one embodiment of the gaming device of the present invention.

In one embodiment, as illustrated in FIG. 2A, the gaming device includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 26. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include one or a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 56. The paylines may be horizontal, vertical, circular, diagonal, angled or any combination thereof. In this embodiment, the gaming device displays at least one and preferably a plurality of reels 34, such as three to five reels 34 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 34 are in video form, the plurality of simulated video reels 34 are displayed on one or more of the display devices as described above. Each reel 34 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS.

1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
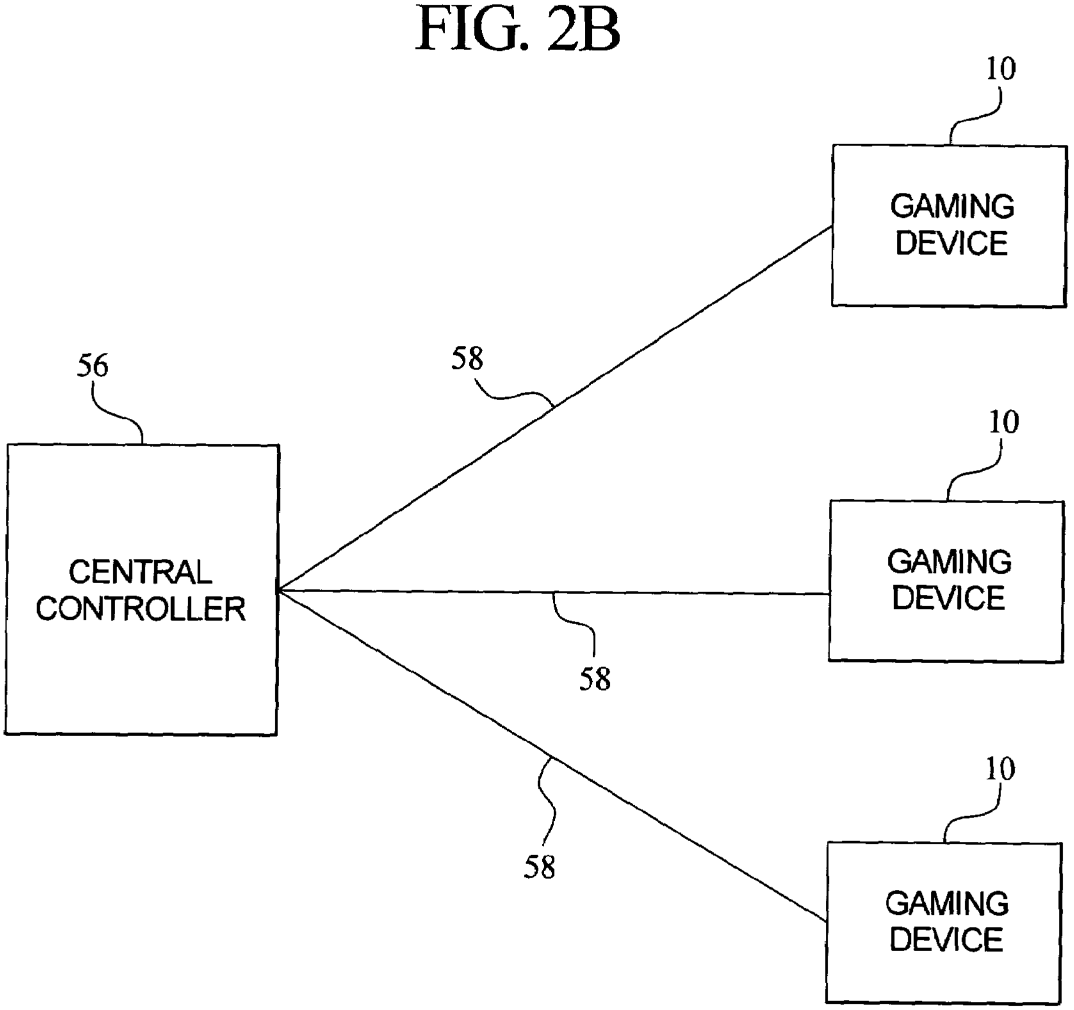
FIG. 2B is a schematic of the network configuration of one embodiment of the gaming device of the present invention.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Game Play

In one embodiment of the present invention, if a player achieves a secondary or bonus game triggering or qualifying condition during the primary game, the gaming device 10 initiates the secondary or bonus game of one embodiment of the present invention. In one embodiment of the present invention, the gaming device 10 determines or causes the determination of a predicted number of matches and an actual number of matches. This predicted number of matches is compared to the actual number of matches and an award is provided to the player based on the absolute value of the difference between the predicted number of matches and the actual number of matches. It should be appreciated that the present invention can include any suitable process, technique, program or formula for determining the predicted number of matches or the first number and the actual number of matches or the second number. Thus, for instance, these numbers can be determined in one or more game sequences, randomly determined, predetermined, determined based on a player's wagers in a primary game, determined based on an outcome of a primary or secondary game, or selected by the player or in any other suitable manner.

Figure 3:
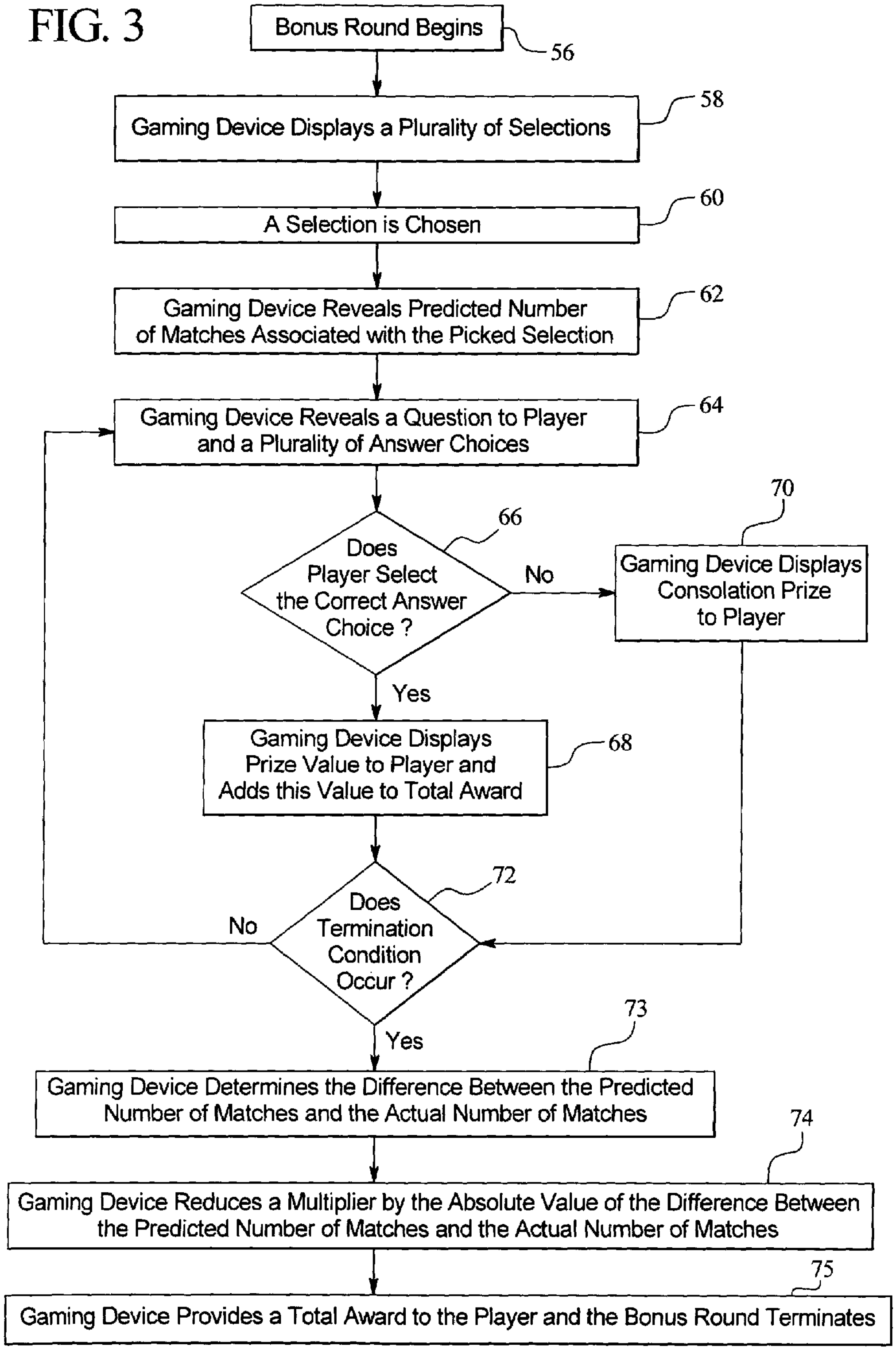
FIG. 3 is a flow chart diagram of the operation of one embodiment of the gaming device of the present invention.
Figure 4A:
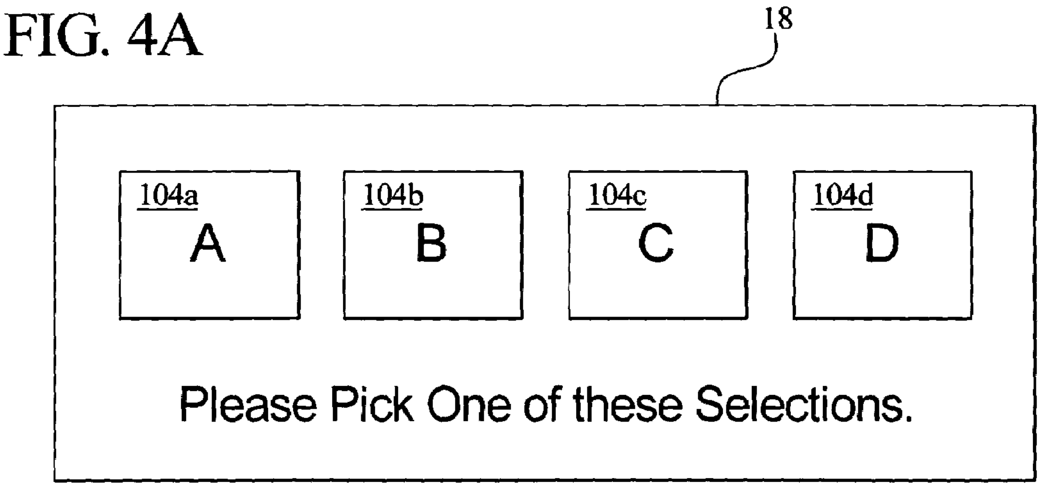
FIGS. 4A, 4B, 4C, 4D, 4E, 4F, 4G, 4H, 4I, 4J, 4K, 4L and 4M are enlarged front elevation views of the display devices of FIG. 1A or 1B illustrating an example of one embodiment of the present invention where the player selects from four unknown predicted number of matches and then attempts to win the largest award possible by matching the answers to different questions.
Figure 4B:
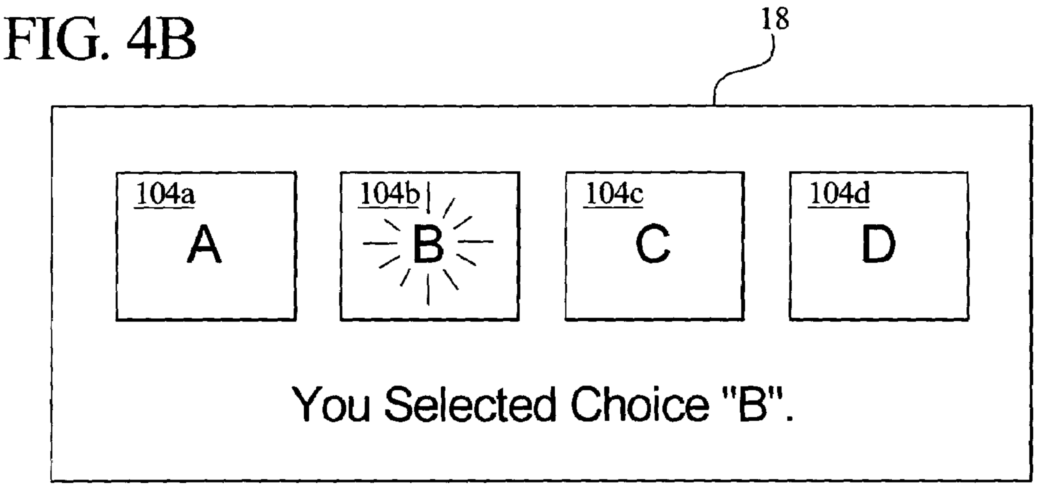
Figure 4C:
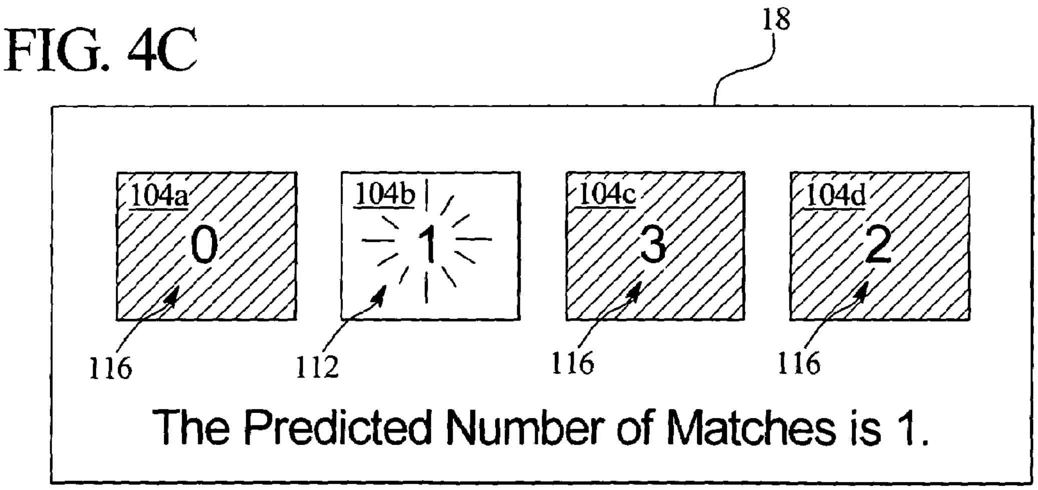

With reference now also to FIGS. 3 and 4A to 4C, the bonus round begins as indicated by block 56 and the gaming device 10 displays a plurality of predicted number of matches 104*a* to 104*d* (see block 58). The gaming device 10 directs the player to select one of the various predicted number of matches 104*a* to 104*d*. The gaming device 10 can provide this direction to the player in the manner shown in FIG. 4A, or in any other suitable manner. In FIG. 4B, the gaming device 10 highlights the players selected predicted number of matches 104*b*, as also indicated by block 60 in FIG. 3. The gaming device 10 reveals the selected predicted number of matches 112 and well as the non-selected predicted number of matches 116, as also indicated by block 62 of FIG. 3.

Figure 4D:
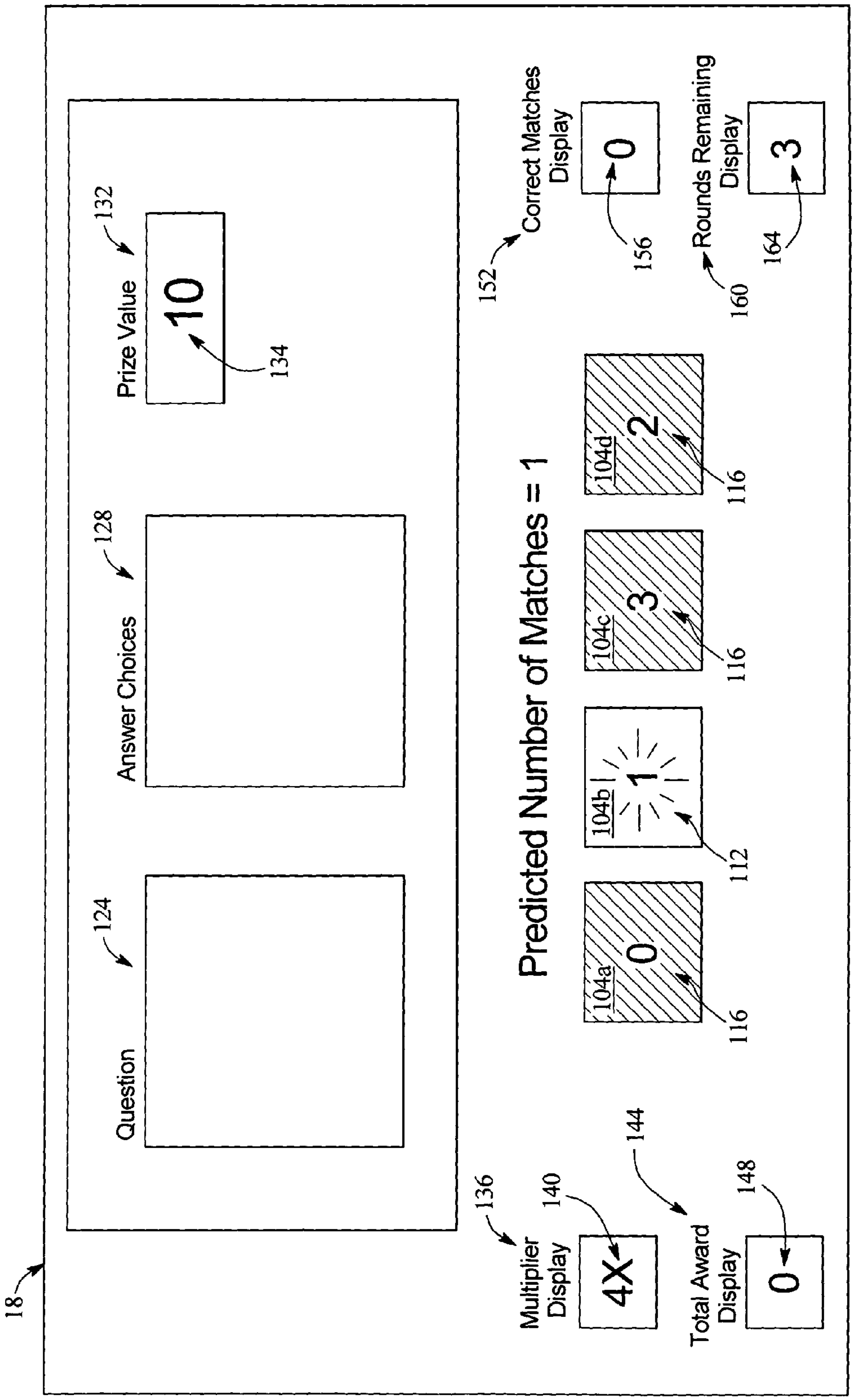

With reference to FIG. 4D, the upper display device 18 includes a question display 124, an answer choices display 128 and a prize value display 132 for informing the player of the prize value 134 associated with the particular matching attempt. The prize value 134 is displayed to the player for a correct match. It should be appreciated that any suitable prize value 134 may be used in the matching round including, but not limited to values, free games, free spins, multipliers and any combination therein. The gaming device 10 of this embodiment has a multiplier display 136 that displays a multiplier 140. The initial or constant multiplier 140 in one embodiment is 4×. The upper display device 18 also includes a total award display 144, and all prize values 134 awarded to the player are added to the total award 148. In one embodiment, the player enters the bonus round with a total award 148 of zero. The remaining multiplier 140 is applied to the total award 148 at the end of the bonus game to determine the player's award. It should be appreciated that in this embodiment, the multiplier 140 is not limited to 4×, but may be any suitable value or other modifier modifying the total award 148.

The upper display device 18 also includes a correct matches display 152, which displays the accumulated number of correct matches 156. The display includes a rounds remaining display 160, which displays the number of questions or rounds remaining 164. In this embodiment, the total number of questions or rounds is three, as indicated by the rounds remaining display 160. It should be appreciated, that in this embodiment, the total number of questions or rounds is not limited to three, but may be any positive number. The rounds remaining display 160 can provide the rounds remaining 164 in the form of a number, a plurality of symbols, or any other suitable method.

Figure 4E:
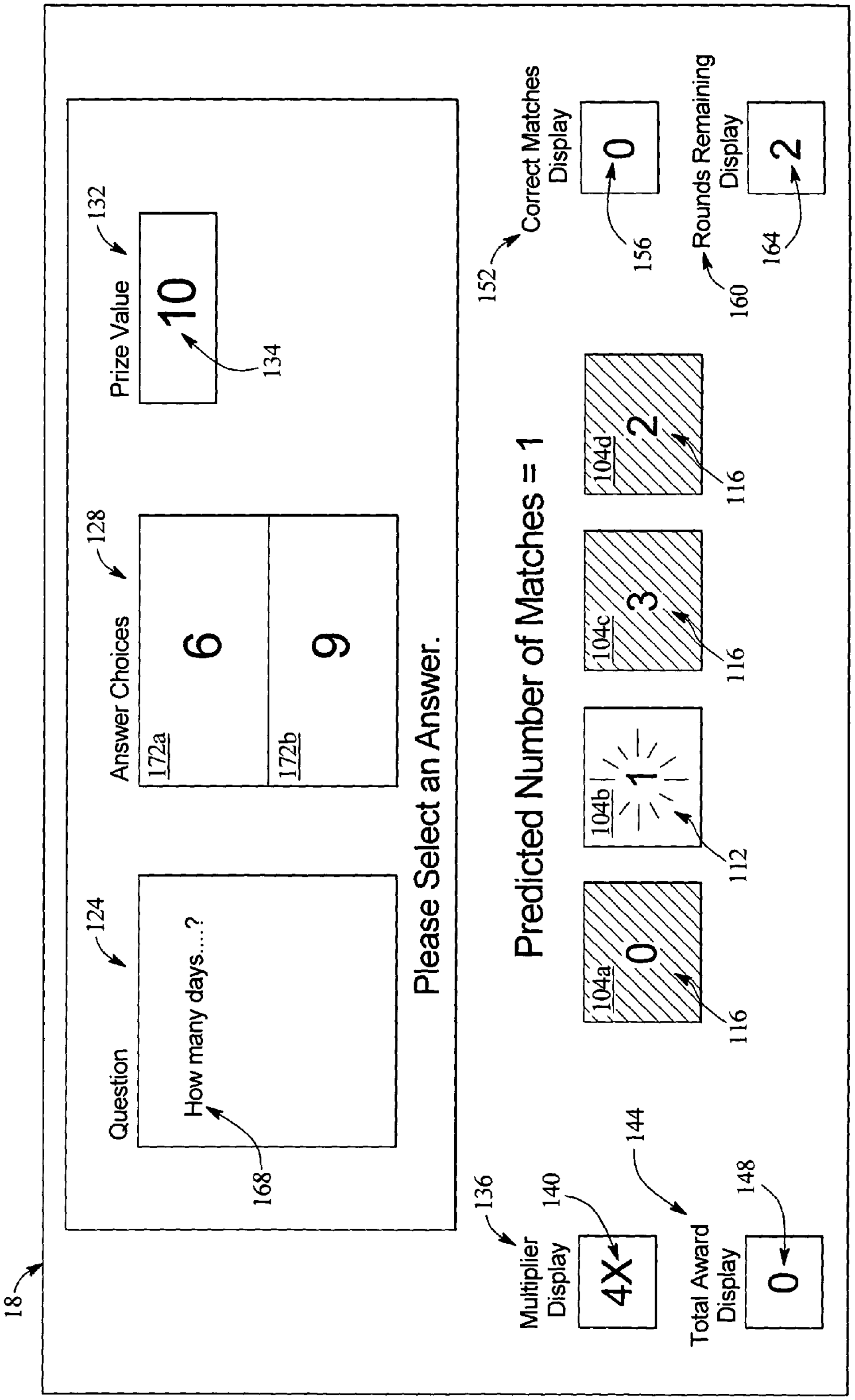

At this point, with reference now also to FIG. 4E, the gaming device 10 begins the matching sequence (as also indicated by block 64 in FIG. 3), by displaying a question 168 and a plurality of answer choices 172*a* and 172*b* from which the player can select. At the beginning of the first round of the matching sequence, the gaming device 10 decrements the number of rounds remaining 164 by one, such that the number of rounds remaining 164 is two. The gaming device 10 reveals the prize value 134 of ten associated with this round of the matching sequence. In this embodiment, there are two answer choices 172*a* and 172*b*, but it should be appreciated that any suitable number of choices may be used.

Figure 4F:
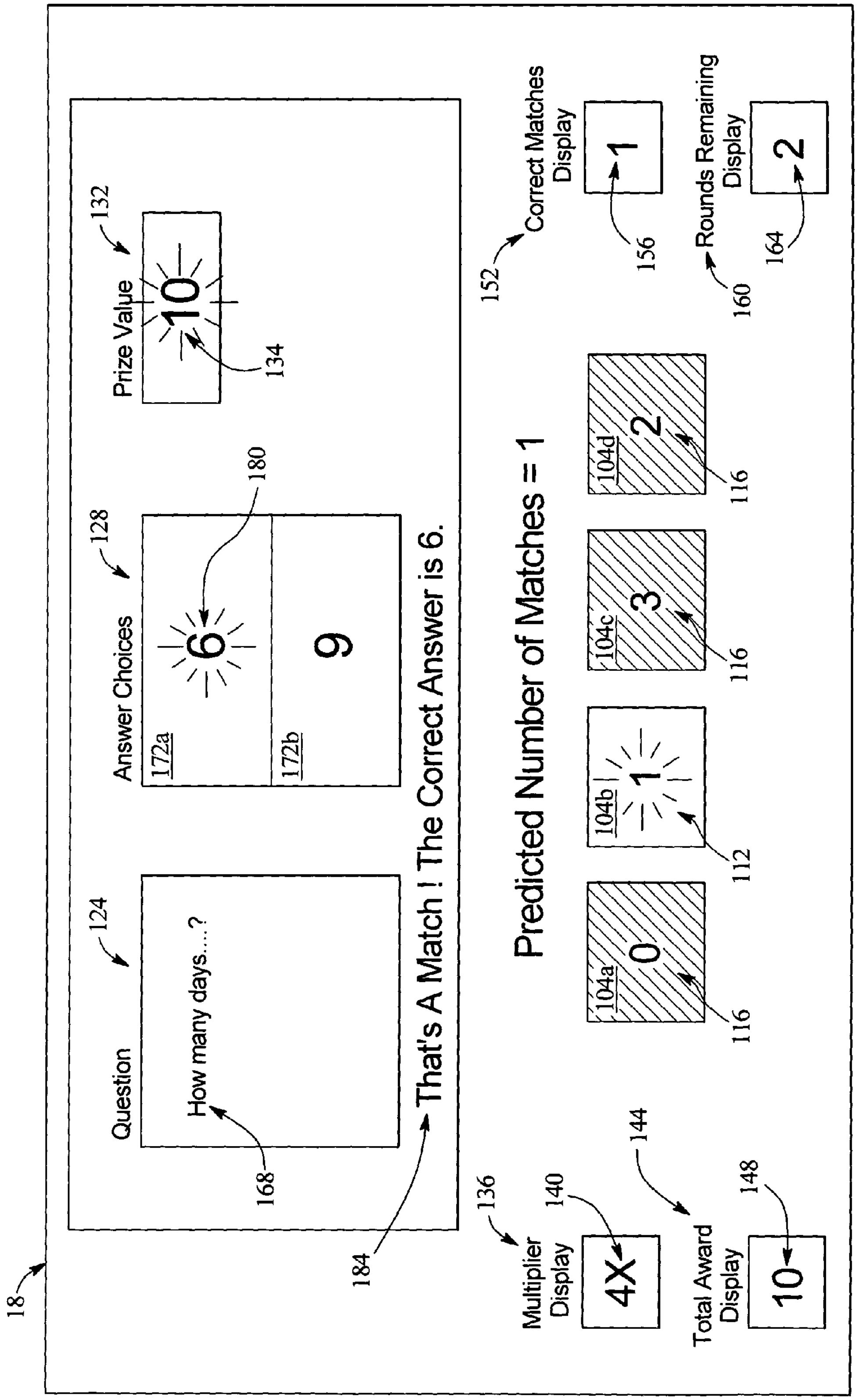

At this point the player has the option of choosing from answer choices 172*a* and 172*b* of six and nine respectively. If the player believes that the correct answer is six, the player would select answer choice 172*a*. Alternatively, in this example, because the predicted number of matches is low (i.e., one) the player may try to maximize the total award 148 by intentionally selecting an answer choice that the player believes to be incorrect. With reference to FIG. 4F, in this example, the selected answer choice 172*a* is six. As indicated by diamond 66 in FIG. 3, the gaming device 10 determines whether or not the player selected answer 180 matches the correct answer. The gaming device 10 indicates in the match results display 184, that the player selected answer 180 was correct. The gaming device 10 then displays a prize value 134 to the player and adds the prize value 134 to the total award 148, as indicated by block 68 in FIG. 3. The gaming device 10 then increments the number of correct matches 156 by one on the correct matches display 152 as illustrated in FIG. 4F. As illustrated in FIG. 3, after the gaming device displays the prize value to the player, the gaming device determines if a terminating condition has occurred, as indicated by diamond 72. In this embodiment, the terminating condition occurs after the player has played a predetermined number of rounds, and occurs when the number of rounds remaining 164 is zero. In the example shown in FIG. 4F, the number of rounds remaining 164 is two, therefore the terminating condition has not occurred and the gaming device 10 proceeds with the next matching round.

Figure 4G:
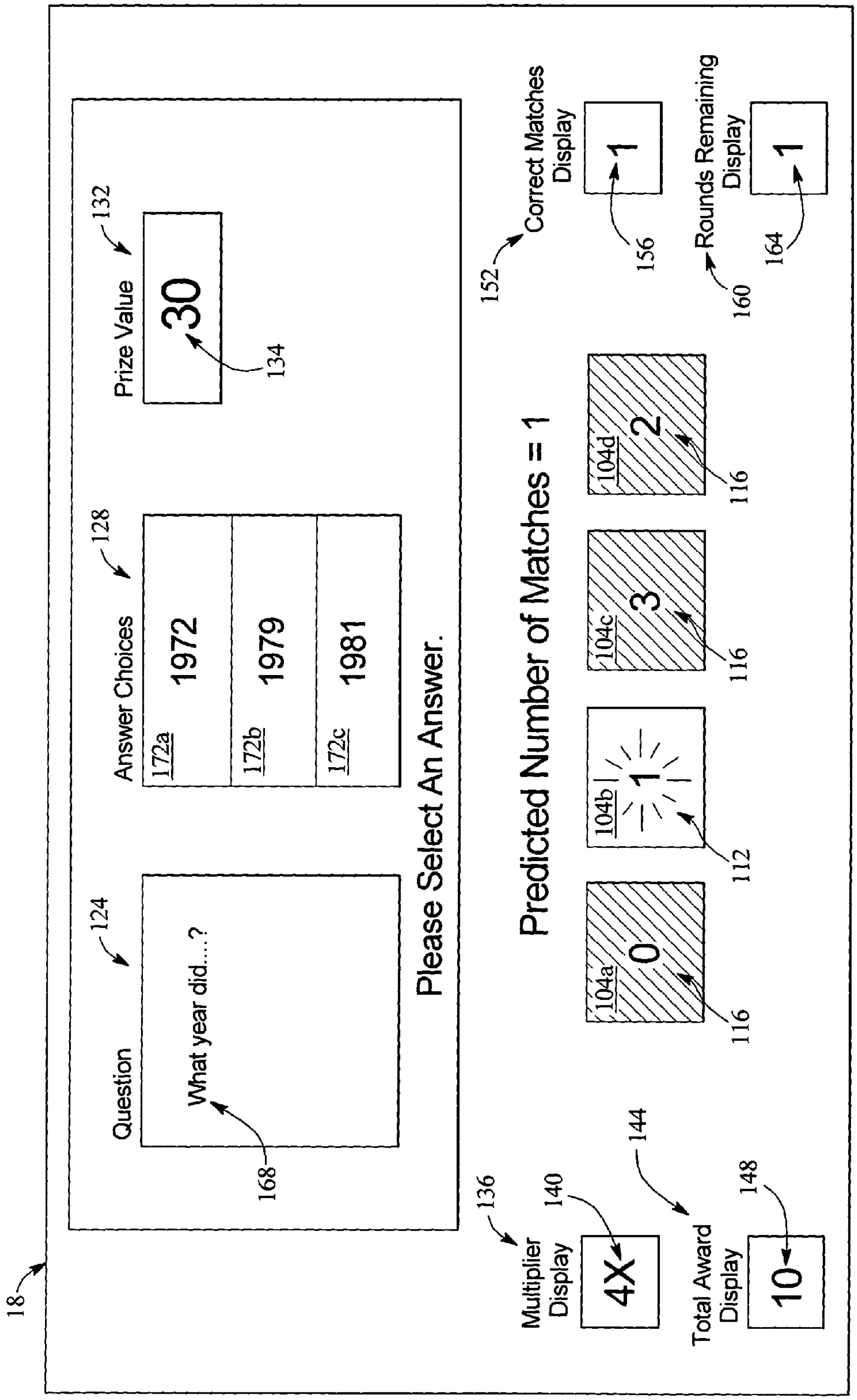

In this embodiment, the number of answer choices 172*a* to 172*c* increases with each round, as shown in FIG. 4G. In this example, there are three answer choices 172*a* to 172*c*. With the number of answer choices 172*a* to 172*c* increasing, the probability of selecting a correct match decreases. In this embodiment, to compensate for the decreased probability of success, the gaming device 10 provides a larger prize value 134. Therefore, in this embodiment the number of answer choices 172*a* to 172*c* is inversely related to the prize value 134. It should be appreciated that with each round, the number of answer choices may be constant, it may increase, decrease, be predetermined, be randomly determined or determined in any suitable manner. Likewise, it should be appreciated that the prize value may be constant, increase, decrease, be predetermined, be randomly determined or be determined in any suitable manner.

At the beginning of the second round of the matching sequence, the gaming device 10 decrements the number of rounds remaining 164 by one, such that the number of rounds remaining 164 is one. The gaming device 10 reveals the prize value 134 of thirty associated with this round of the matching sequence. The gaming device 10 provides three answer choices 172*a*, 172*b* and 172*c*: 1972, 1979, and 1981. At this point, the selected predicted number of matches 112 equals the number of correct matches 156. The player may attempt to get a correct match to achieve the prize value 134. Alternatively, the player may try for an incorrect match so that the number of correct matches 156 remains equal to the selected predicted number of matches 112. As stated above, in this embodiment the multiplier 140 is reduced by the absolute value of the difference between the number of correct matches 156 and the predicted number of matches 104. Any more correct matches would thus decrease the multiplier 140 and would negatively affect the size of the total award 148 at the end of the bonus round.

Figure 4H:
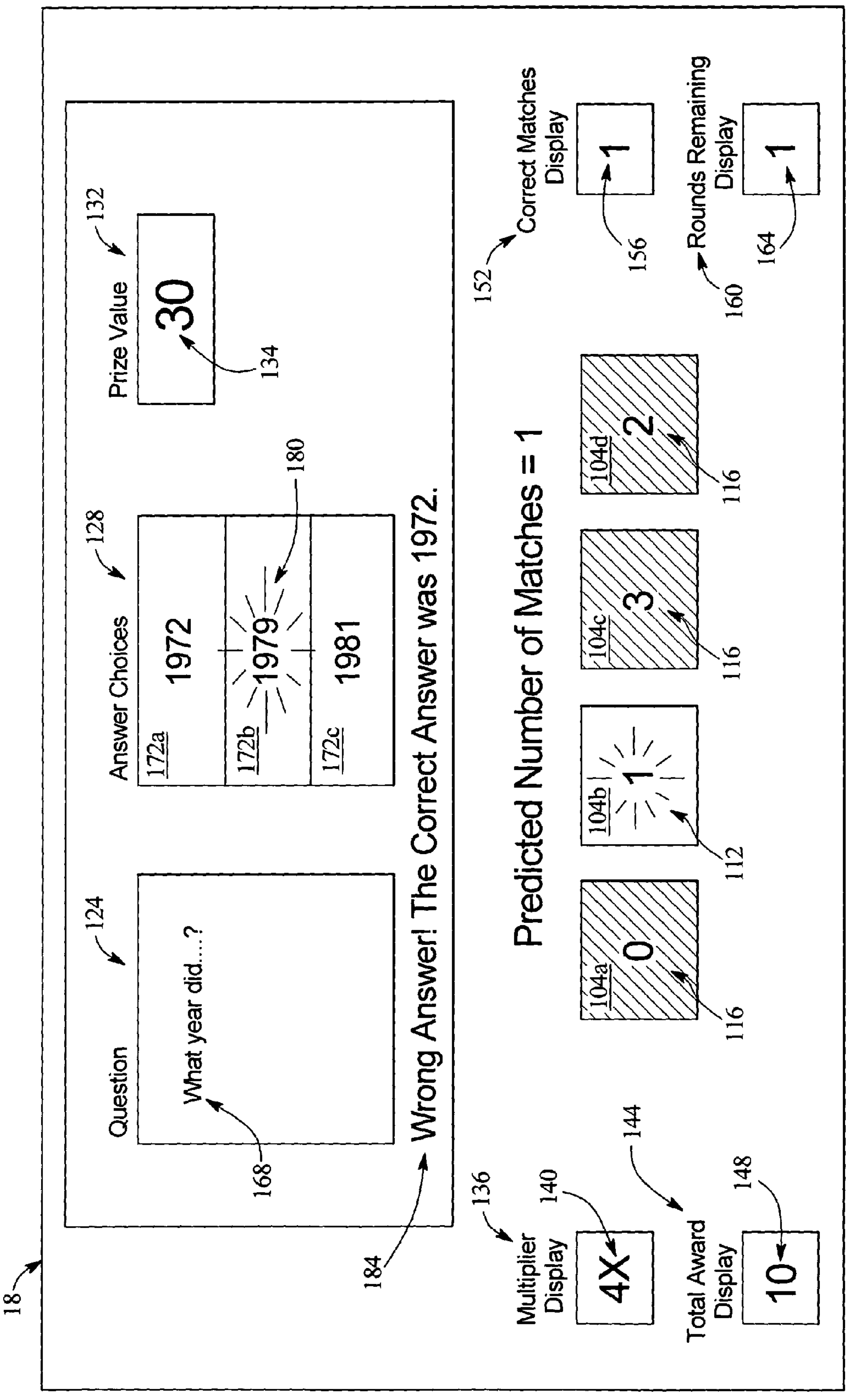
Figure 4I:
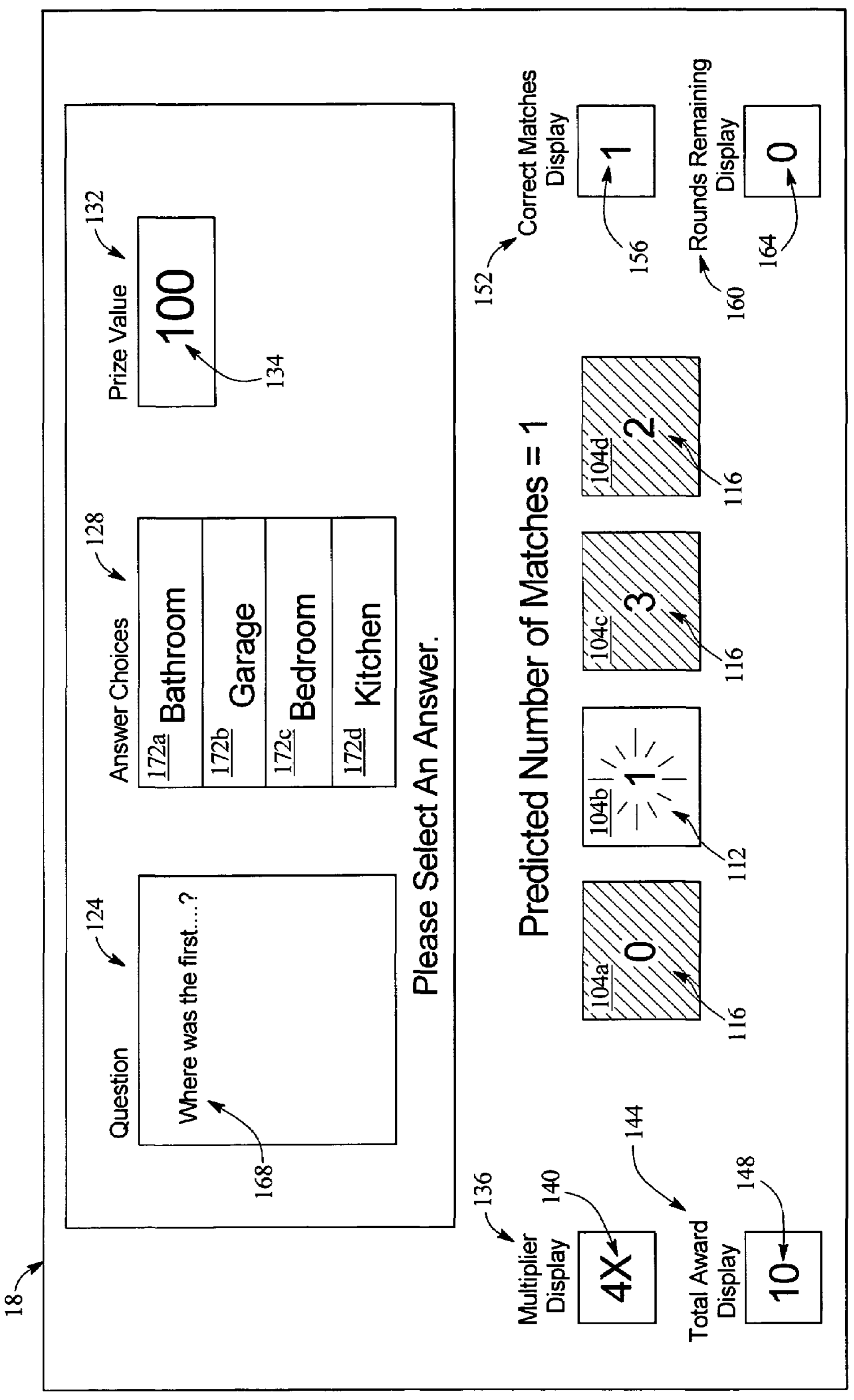

With reference now also to FIG. 4H, in this example, the player chose to select the answer choice 172*b* with a value of 1979. As indicated by diamond 66 in FIG. 3, the gaming device 10 determines whether or not the player selected answer 180 matches the predetermined answer. The gaming device 10 indicates on the match results display 184, that the player selected answer 180 was incorrect. As stated before, after the gaming device 10 awards the prize value 134 to the player, a terminating condition may occur, as also indicated in FIG. 3 by diamond 72. In this embodiment, the terminating condition occurs after the player has played a predetermined number of rounds, and occurs when the number of rounds remaining 164 is zero. In the example shown in FIG. 4H, the number of rounds remaining 164 is one. Therefore, the gaming device 10 proceeds with the next matching round.

Figure 4J:
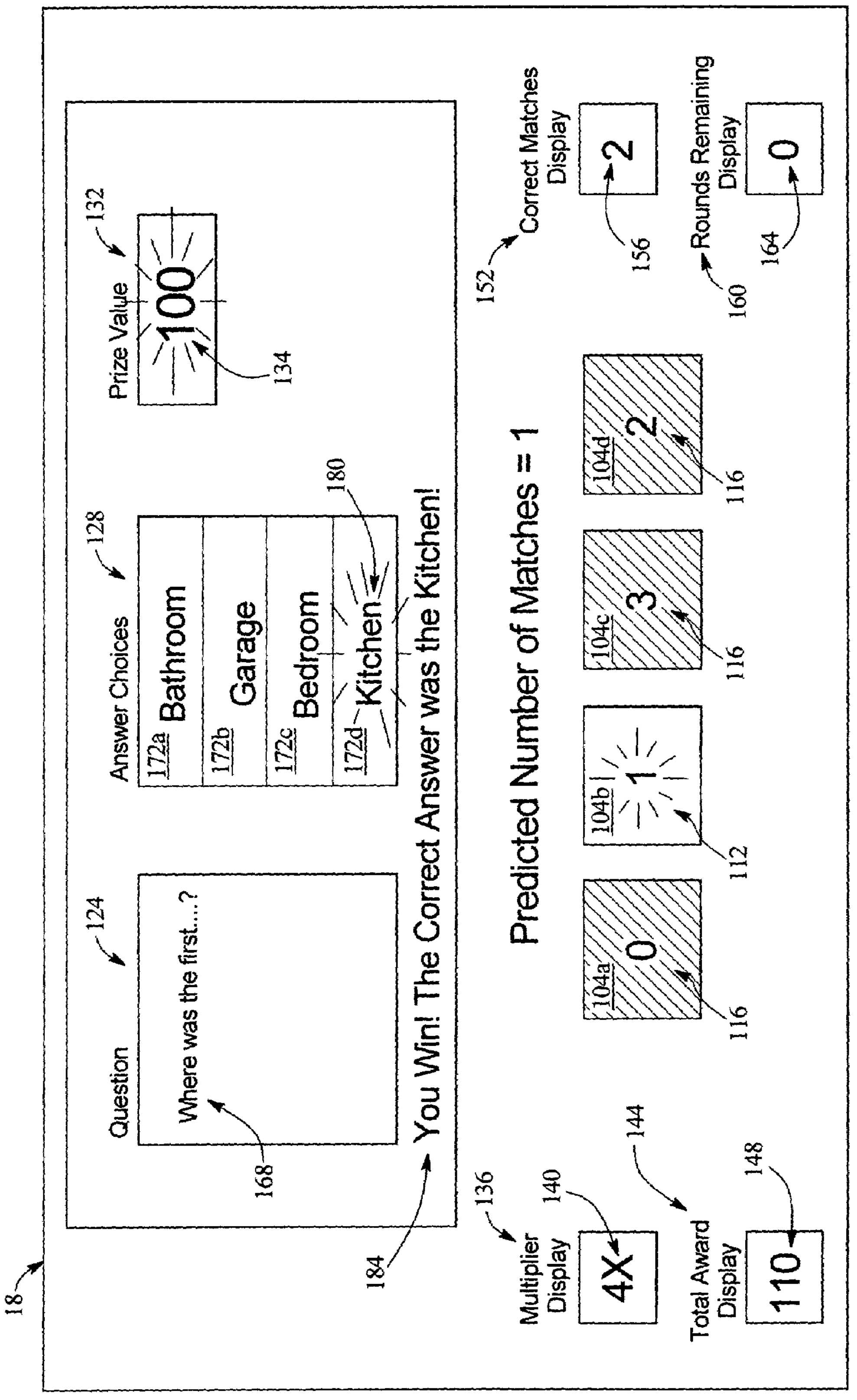

With reference now also to FIG. 41, at the beginning of the third round of the matching sequence, the gaming device 10 decrements the number of rounds remaining 164 by one, such that the number of rounds remaining 164 is now zero. The gaming device 10 reveals the prize value 134 of 100 associated with this round of the matching sequence. In this embodiment, there are four answer choices 172*a* to 172*d*, but it should be appreciated that any suitable number of choices could have been used. The gaming device 10 provides the answer choices 172*a* to 172*d*: Bathroom, Garage, Bedroom and Kitchen. With reference to FIG. 4J, in this example, the selected answer choice 172*d* was Kitchen. As indicated by diamond 66 in FIG. 3, the gaming device 10 determines whether or not the player selected answer 180 matches the correct answer. The gaming device 10 indicates on the match results display 184 that the player selected answer 180 was correct. The gaming device 10 increments the number of correct matches 156 to two. The gaming device 10 then awards the prize value 134 to the player and adds this value to the total award 148. As stated before, after the gaming device 10 awards the prize value 134 to the player, a terminating condition may occur, as indicated in FIG. 3 by diamond 72. In the example shown in FIG. 4J, the number of rounds remaining 164 is zero, therefore the termination condition is satisfied and the gaming device 10 proceeds to calculate the final total award 148.

Figure 4K:
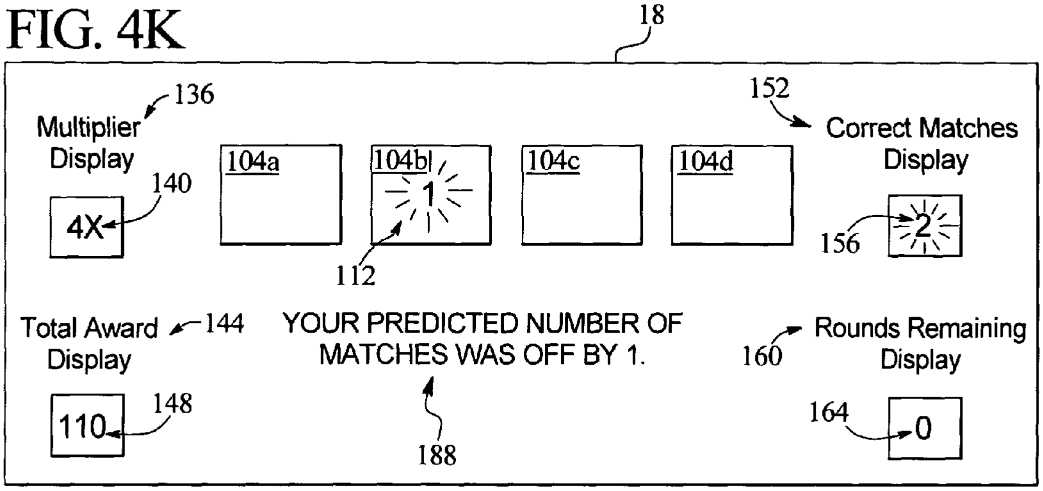
Figure 4L:
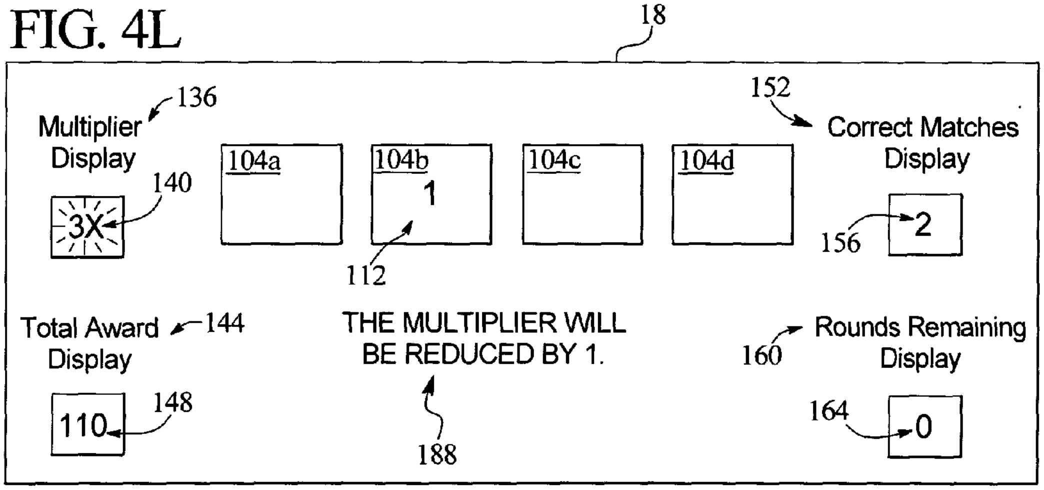
Figure 4M:
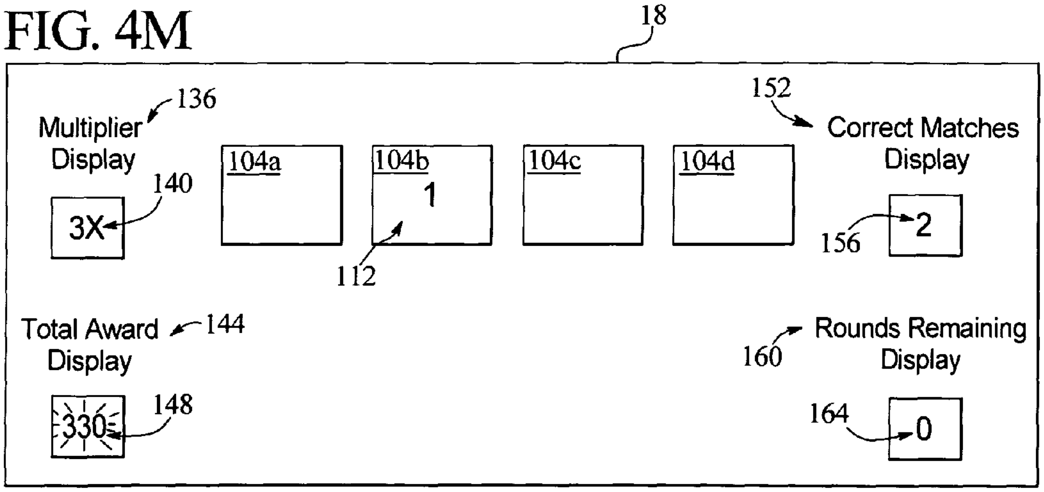

Referring now also to FIG. 4K, the gaming device 10 calculates the absolute value of the difference between the value of the selected predicted number of matches 112 and the number of correct matches 156, and displays this value on the multiplier modification display 188. The gaming device 10 displays on the multiplier modification display 188, that the multiplier 140 will be modified. In this example, as indicated in FIG. 4L, the multiplier 140 is reduced by one. The gaming device 10 modifies the value of the multiplier 140 in the multiplier display 136 from 4× to 3×. As indicated in FIG. 4M, the total award 148 is multiplied by the multiplier 140, and the total award of 330 is displayed in the total award display 144. Finally, the gaming device 10 provides the total award 148 to the player and the bonus round terminates. It should be appreciated that the multiplier can be the same if no matches were made.

Figure 5A:
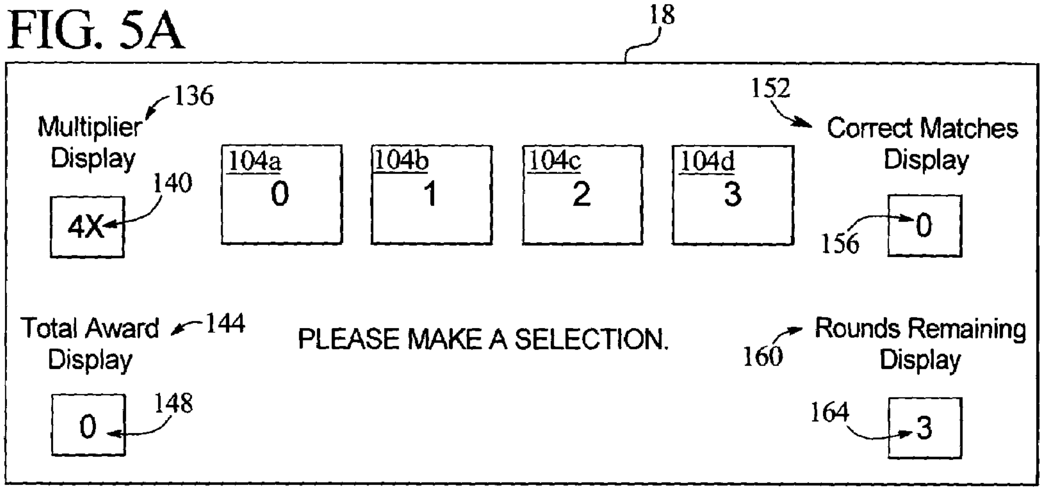
FIGS. 5A, 5B and 5C are enlarged front elevation views of the display devices of FIG. 1A or 1B illustrating an example of one embodiment of the present invention where the player selects from four known predicted number of matches and then attempts to win the largest award possible by matching the answers to different questions.
Figure 5B:
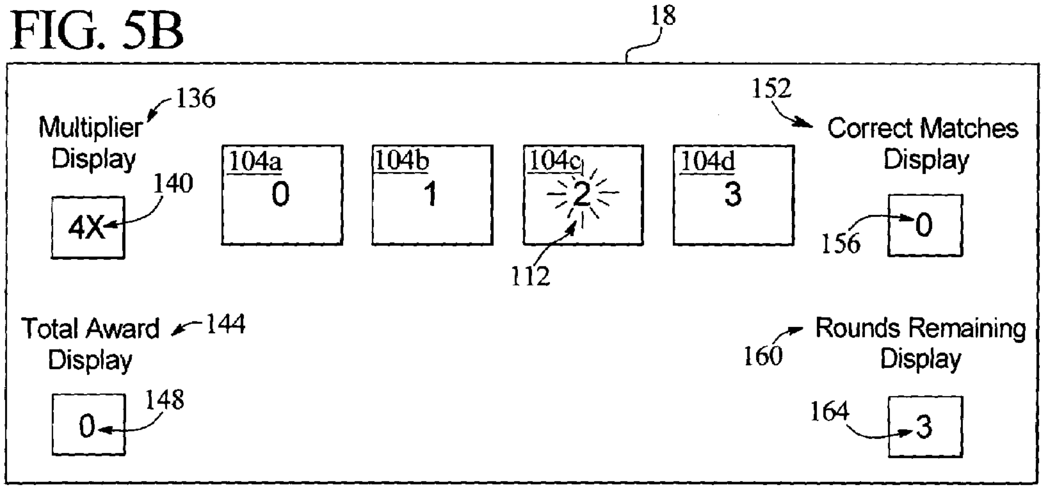
Figure 5C:
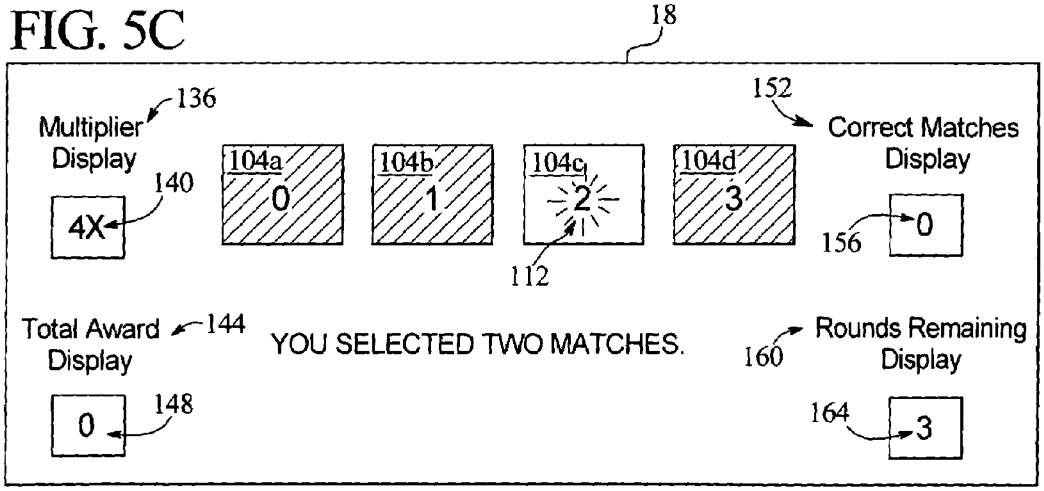

FIGS. 5A, 5B and 5C are enlarged front elevation views of the upper display device 18 of FIGS. 1A and 1B illustrating an example of another embodiment of the present invention where the player selects from four known predicted number of matches 104*a* to 104*d* and then attempts to win the largest total award 148 possible by matching the player selected answer to different questions as described in FIGS. 4D to 4J. In this embodiment, the upper display device 18 provides the values of the selected predicted number of matches 112 before the player makes a selection. In this embodiment, the gaming device 10 allows the player to choose the exact value of the predicted number of matches 104*a* to 104*d* which the player wants to try to match. While the results in this embodiment are still random or predetermined in a central determination system embodiment, this appears to give the player more involvement in the outcome of the game. In FIG. 5B, the selected predicted number of matches 104*c* and the value of the selected predicted number of matches 112 is two. The gaming device 10 indicates or highlights the value of the selected predicted number of matches 112 from the non-selected predicted number of matches 116 in any suitable manner. It should be appreciated that the gaming device 10 may indicate or highlight the value of the selected predicted number of matches 112, or deactivate the non-selected predicted number of matches 116, or implement any other suitable method of distinguishing the selection. In one embodiment, the matching sequence proceeds in the same manner as described in relation to FIGS. 4D to 4J. Then, the gaming device 10 proceeds to calculate the final total award 148 in a manner similar to that described in relation to FIGS. 4K to 4M and the bonus round terminates.

Figure 6A:
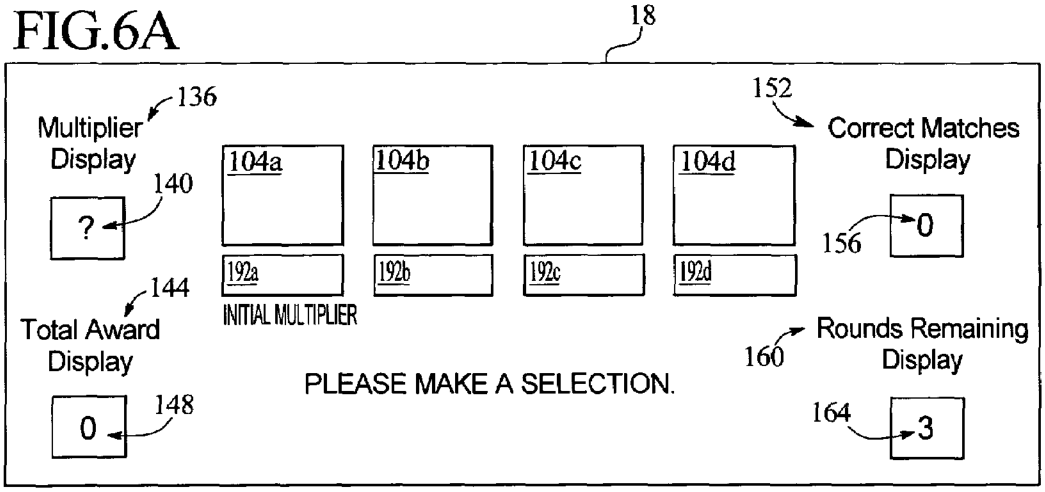
FIGS. 6A and 6B are enlarged front elevation views of the display devices of FIG. 1A or 1B illustrating an example of one embodiment of the present invention where the player selects from four unknown predicted number of matches, each of the possible selections corresponding to a different multiplier.
Figure 6B:
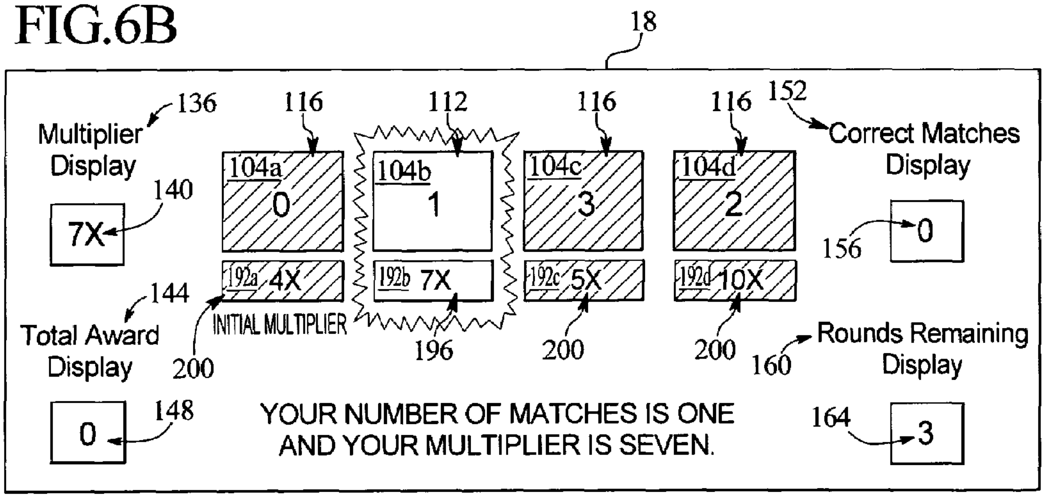

FIGS. 6A and 6B are enlarged front elevation views of the display devices 18 of FIGS. 1A and 1B illustrating an example of the embodiment of the present invention where there are four unknown predicted number of matches 104*a* to 104*d*, with each of the possible selections corresponding to a different player selected modifier such as a multiplier 192*a* to 192*d*. It should be appreciated that the initial player selected multipliers 192*a* to 192*d*, may be randomly determined, selected from a pool, may all be the same, or may have one or more or all be different, or be determined with by any other suitable method. In one such embodiment, the multiplier display 136 does not display the multiplier 140 until after the player has chosen the predicted number of matches 104*a* to 104*d*. With reference to FIG. 6B, the gaming device 10 reveals the value of the selected predicted number of matches 112. The gaming device 10 also reveals the non-selected predicted number of matches 104*a*, 104*c* and 104*d*, the player selected multiplier 196 and the non-selected multipliers 200. The player selected multiplier 196 becomes the multiplier 140 for the bonus round and appears in the multiplier display 136. The matching sequence proceeds in a manner described in FIGS. 4D-4J. Then, the gaming device 10 proceeds to calculate the final total award 148 in a manner similar to that described in relation to FIGS. 4K to 4M and bonus round terminates.

Figure 7A:
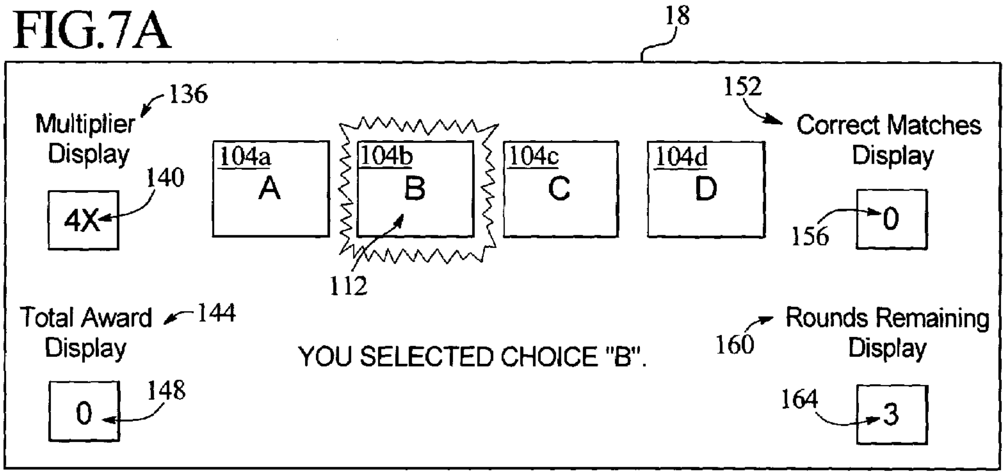
FIGS. 7A, 7B, 7C, 7D, 7E and 7F are enlarged front elevation views of the display devices of FIG. 1A or 1B illustrating an example of one embodiment of the present invention where the player selects from four unknown predicted number of matches, with the result of the selection remaining hidden from the player until the end of the game.
Figure 7B:
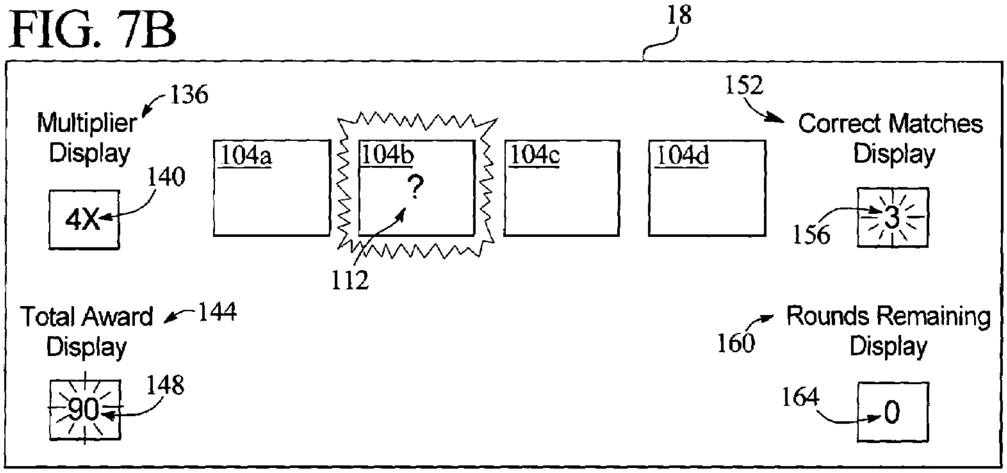

FIGS. 7A to 7F are enlarged front elevation views of the upper display devices 18 of FIGS. 1A and 1B illustrating an example of the embodiment of the present invention where the player selects from four unknown predicted number of matches 104*a* to 104*d*, with the result of the selection remaining hidden from the player until the end of the game. In FIG. 7A, the gaming device 10 recognizes the player's selection. Between FIG. 7A and FIG. 7B, three matching rounds have been played in a manner similar to that explained with reference to FIGS. 4D to 4J, and wherein the player has accumulated a total award 148 of 90 and the rounds remaining 164 are zero. Therefore, the termination condition is fulfilled, as indicated by diamond 72 in FIG. 3, and the gaming device 10 proceeds to calculate the final total award 148.

Figure 7C:
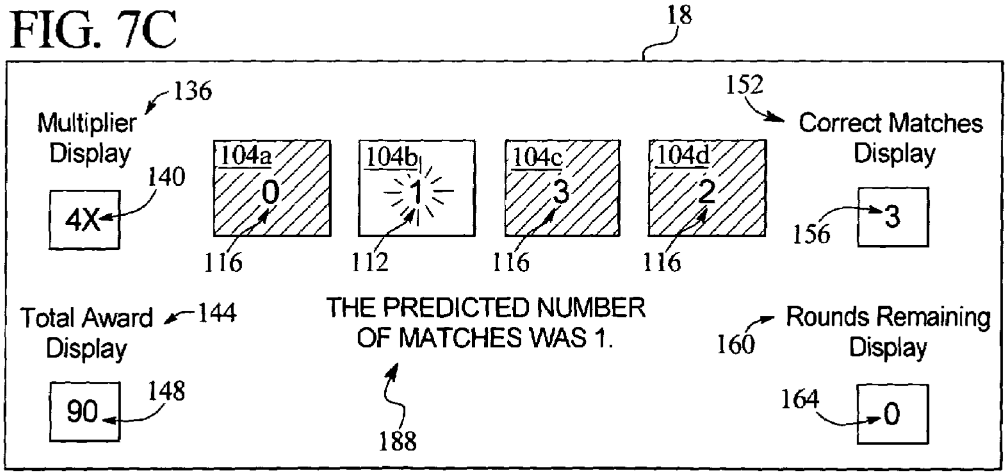
Figure 7D:
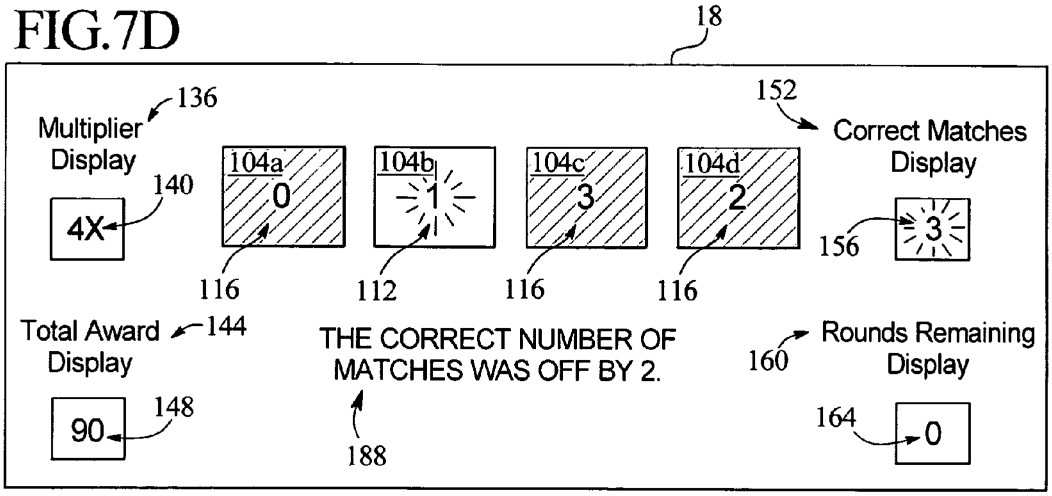
Figure 7E:
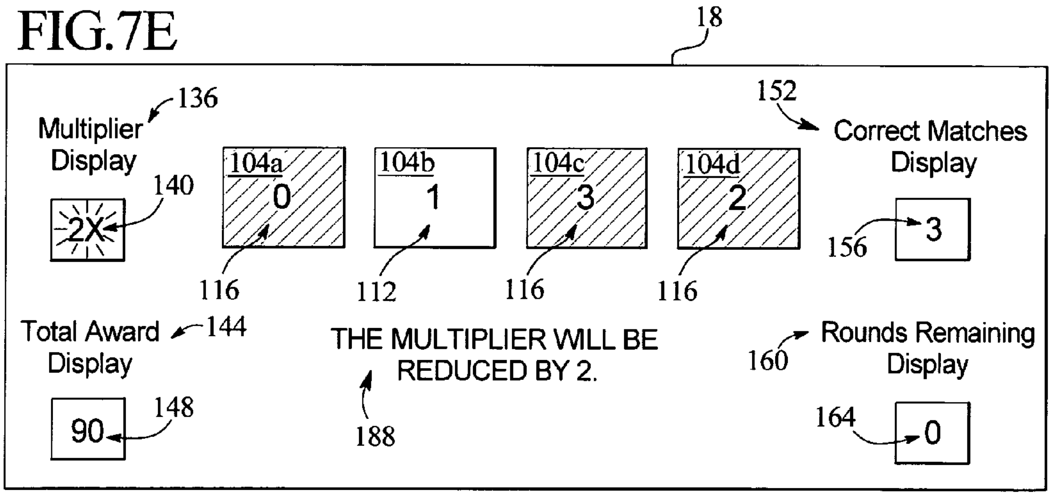
Figure 7F:
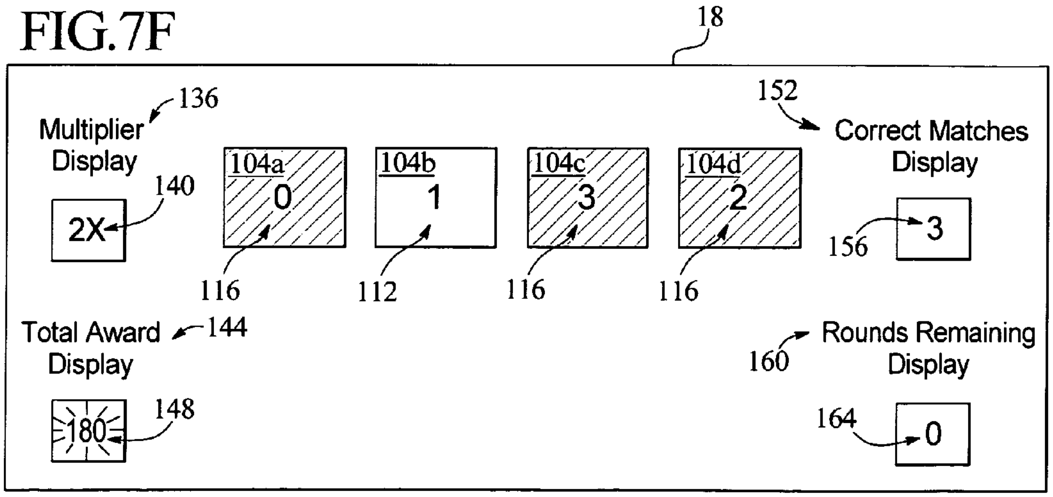

Referring to FIG. 7C, the gaming device 10 reveals to the player the value of the selected predicted number of matches 112 as well as the values of the non-selected predicted number of matches 116, as indicated by block 62 of FIG. 3. The gaming device 10 displays the value of the selected predicted number of matches 112 in the multiplier modification display 188. In referring to FIG. 7D, the gaming device 10 calculates the absolute value of the difference between the value of the selected predicted number of matches 112 and the number of correct matches 156, and displays this value on the multiplier modification display 188. The gaming device 10 displays how the multiplier 140 will be modified on the multiplier modification display 188, as indicated in FIG. 7E. In this example, as indicated in FIG. 7E, the multiplier 140 will be reduced by two. The gaming device 10 modifies the value of the multiplier 140 in the multiplier display 136 from 4× to 2×. As indicated in FIG. 7F, the total award 148 is multiplied by the multiplier 140, and the total award of 180 is displayed in the total award display 144. Finally, the gaming device 10 provides the total award 148 to the player and the bonus round terminates.

FIGS. 8A to 8H are enlarged front elevation views of the upper display devices 18 of FIGS. 1A and 1B illustrating an example of another embodiment of the present invention where two selections are made from a plurality of possible choices. In this embodiment, a predicted number of matches 104 is determined in a manner similar to that described in relation to FIGS. 4A to 4C. The matching sequence begins with the gaming device 10 displaying a plurality of selections 208*a* to 208I. It should be appreciated that the gaming device 10 may utilize any suitable number of a plurality of selections 208, and does not have to be arranged in the form of a grid. The selections 208 may be displayed in the form of a list, or any other suitable arrangement. The upper display device 18 of this embodiment includes a correct matches display 152 as well as an attempts remaining display 212. In this embodiment, the matching sequence begins with the gaming device 10 providing the player with three attempts at making correct matches. The attempts remaining 216 are indicated in the attempts remaining display 212. It should be appreciated that the gaming device 10 may provide any suitable number of attempts to the player, and the number of attempts may be randomly determined, predetermined or constant, determined from a particular arrangement of indicia appearing on a plurality of reels 34 in the base game, or in any other suitable manner.

Figure 8A:
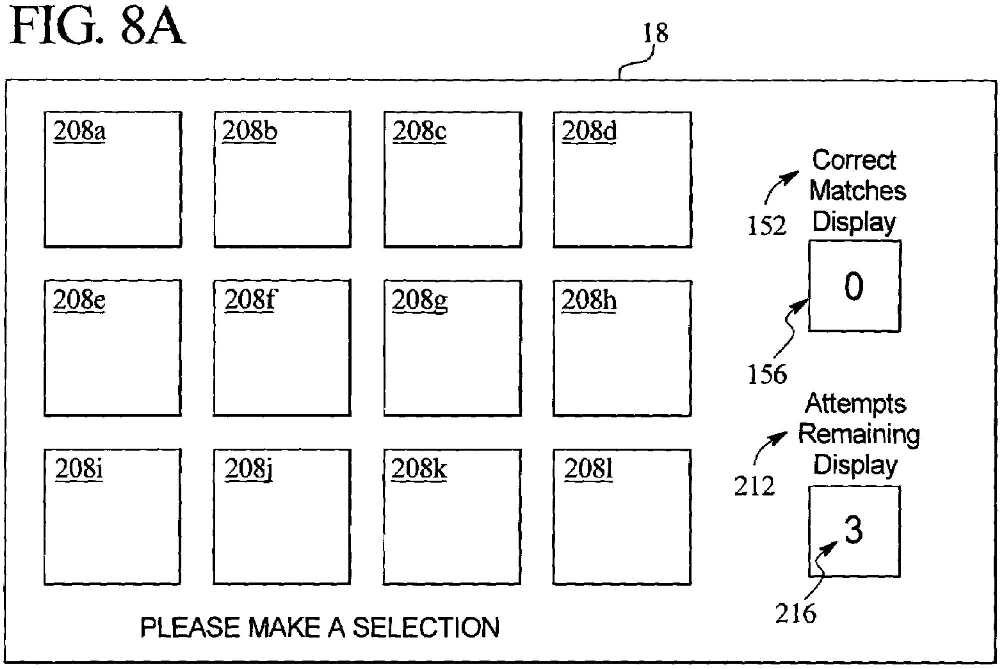
FIGS. 8A, 8B, 8C, 8D, 8E, 8F, 8G and 8H are enlarged front elevation views of the display devices of FIG. 1A or 1B illustrating an example of one embodiment of the present invention where the player attempts to make matches by selecting a from a plurality of possible selections.
Figure 8B:
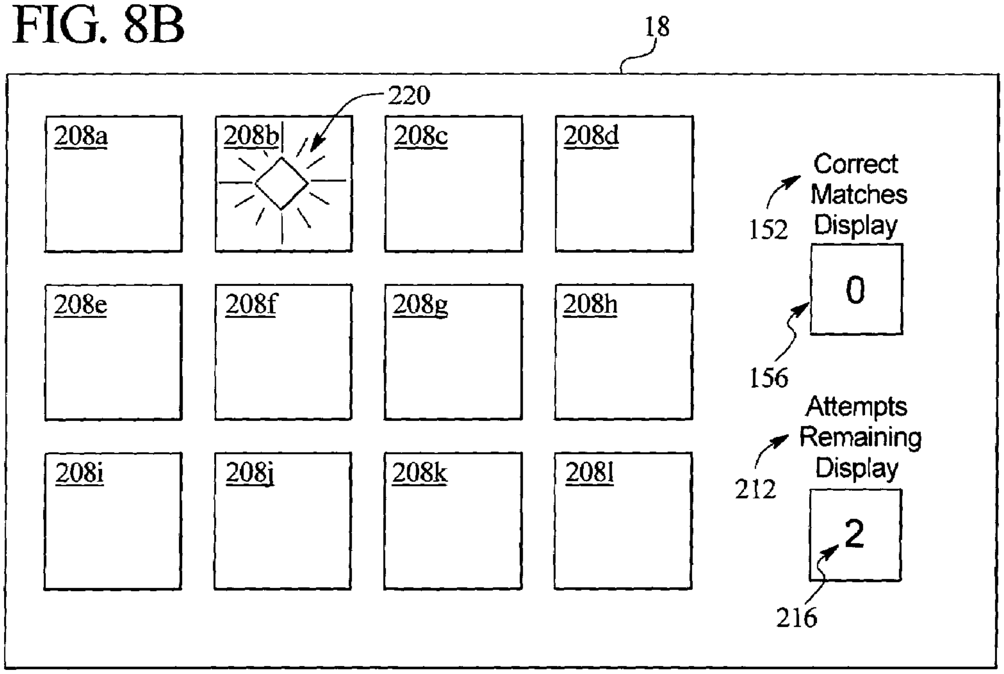
Figure 8C:
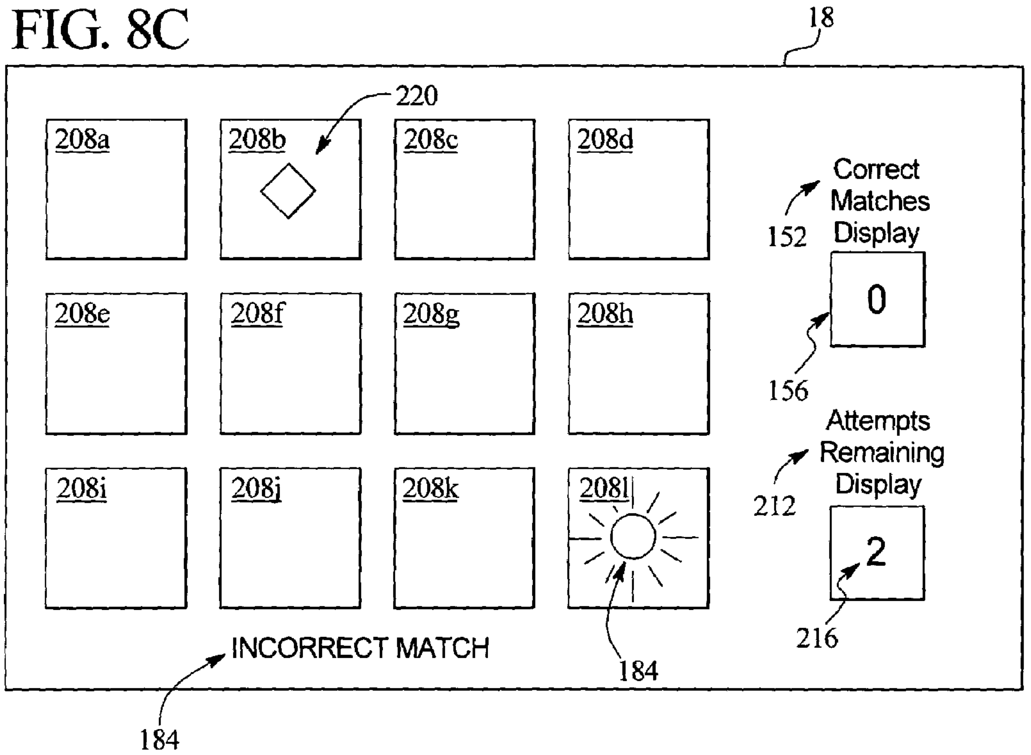
Figure 8D:
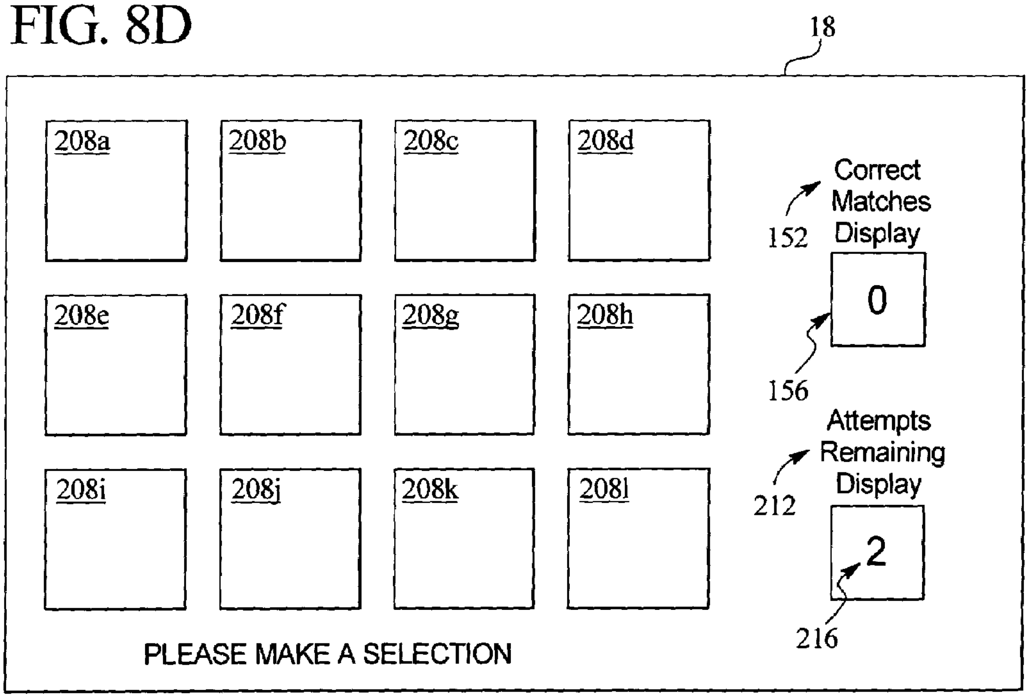

With reference to FIG. 8B, the gaming device 10 recognizes the first selection 220. At the beginning of the first attempt of the matching sequence, the gaming device 10 decrements the number of attempts remaining 216 by one, such that the number of attempts remaining 216 is two. Next, the gaming device 10 reveals the indicia appearing in that selection 208*b*. In this example, the indicia is a diamond, but any value, symbol, word, phrase or other suitable indicia may be used. A second selection is made 224, as indicated in FIG. 8C. The gaming device 10 reveals the indicia appearing in that selection 208*i* to be a circle. The match results display 184 informs the player that there was an incorrect match. As indicated in FIG. 8D, the gaming device 10 hides the previous first selection 208*b* and second selection 208*i* because the match was not successful. In this embodiment, the gaming device 10 does not reset the location of the symbols within the grid. Therefore, the player can rely on his or her memory to aid in making selections 208 in subsequent attempts. It should be appreciated that between attempts, the gaming device 10 could also randomly reset the positions of the indicia within the grid, or change the indicia entirely.

Figure 8E:
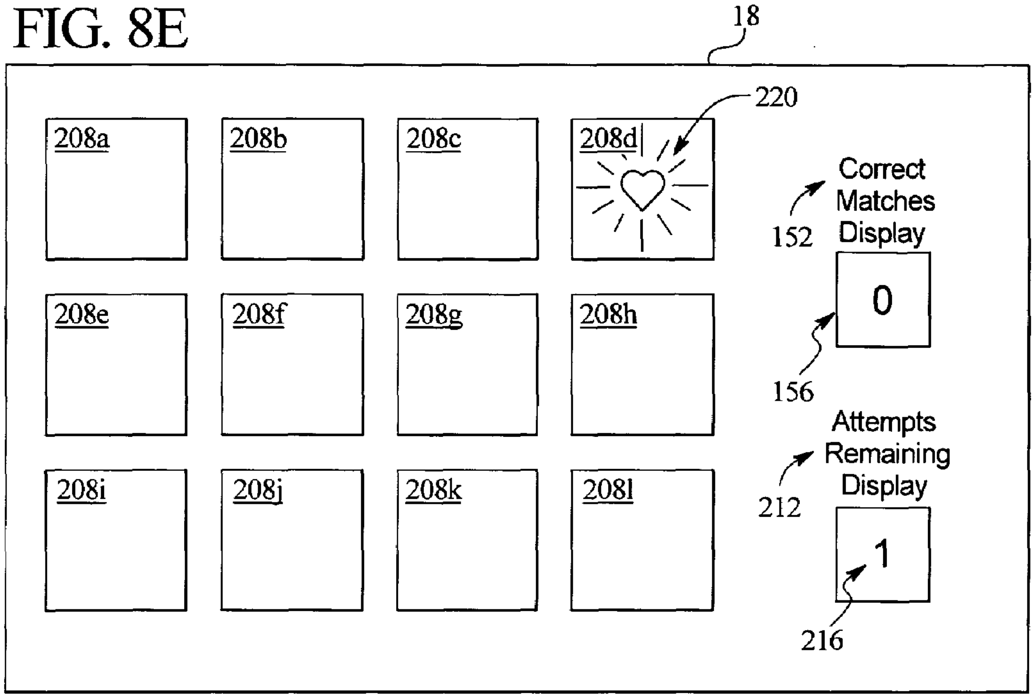
Figure 8F:
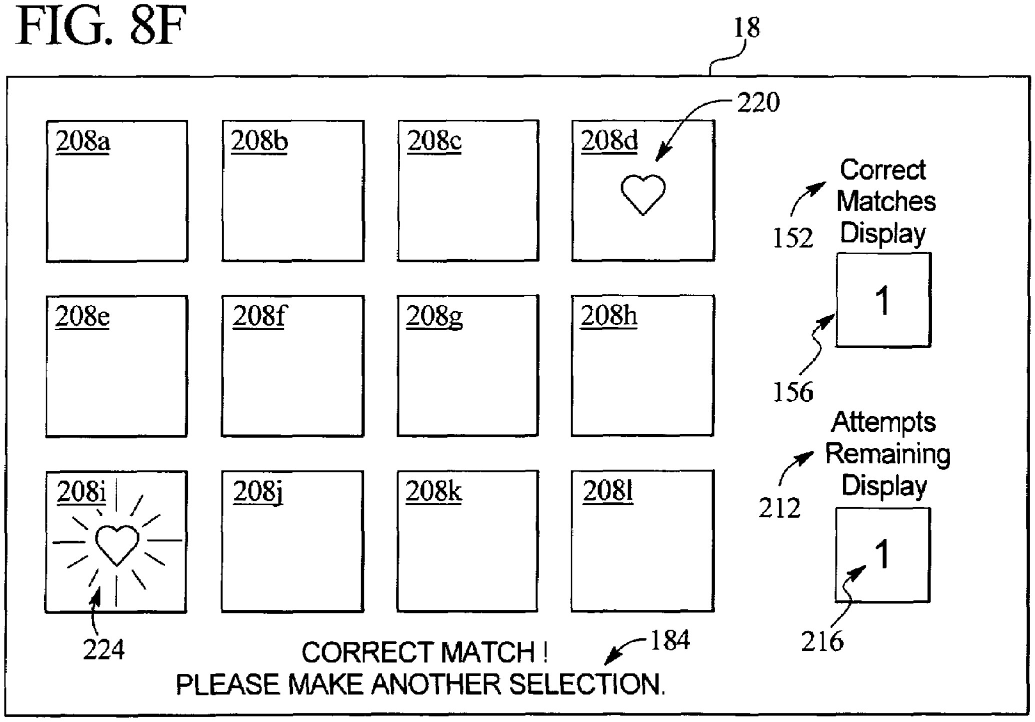

With reference to FIG. 8E, another first selection 220 is made. At the beginning of the second attempt of the matching sequence, the gaming device 10 decrements the number of attempts remaining 216 by one, such that the number of attempts remaining 216 is one. Next, the gaming device 10 reveals the indicia appearing in that selection 208*d*. In this example, the indicia is a heart. A second selection 224 is made, as indicated in FIG. 8F. The gaming device 10 reveals the indicia appearing in that selection 208*i* to be another heart. The match results display 184 informs the player that there was a correct match. The gaming device 10 may award a prize value 134 to the player in the manner indicated in FIG. 4F. The gaming device 10 updates the correct matches display 152, such that the number of correct matches 15 is one.

Figure 8G:
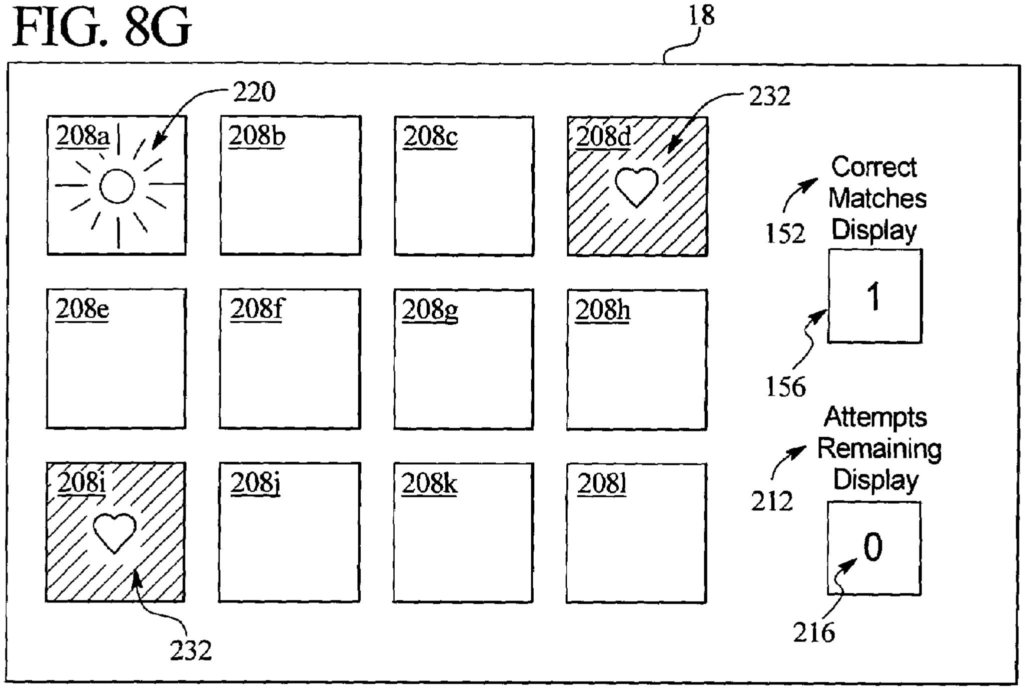
Figure 8H:
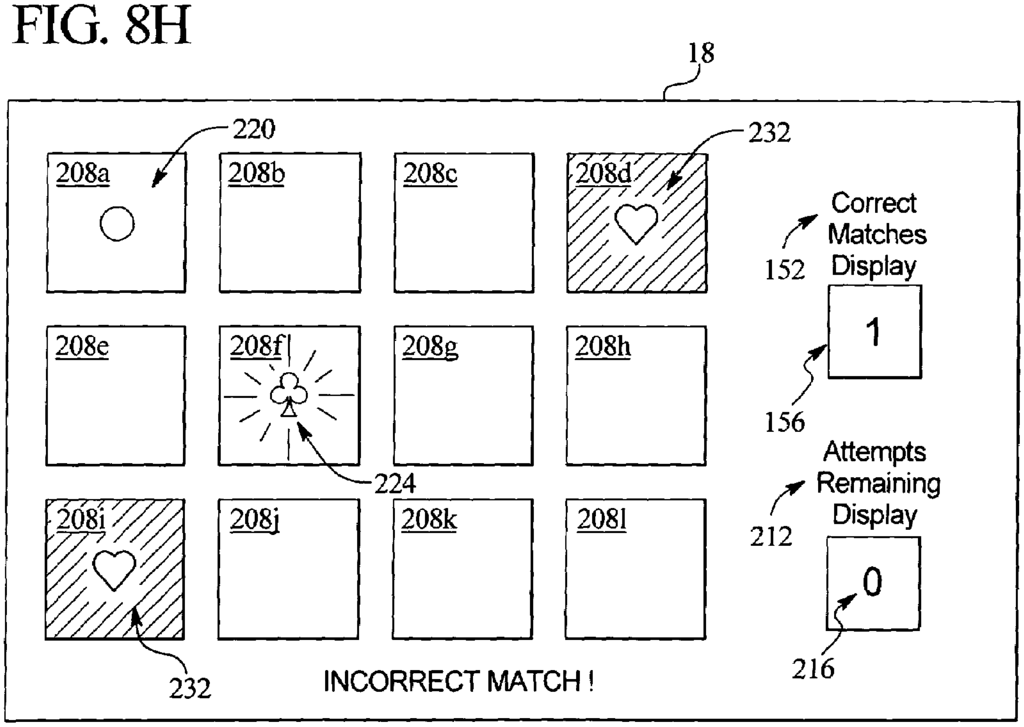

Referring to FIG. 8G, in this embodiment, the gaming device 10 highlights the successful match 232 and then deactivates selections 208*d* and 208*i* so that they are no longer selectable. The player makes another first selection 220. At the beginning of the third attempt of the matching sequence, the gaming device 10 decrements the number of attempts remaining 216 by one, such that the number of attempts remaining 216 is zero. Next, the gaming device 10 reveals the indicia appearing in that selection 208*a*. In this example, the symbol is a circle, but any value, symbol, word, phrase or other suitable indicia may be used. The player then makes a second selection 224, as indicated in FIG. 8H. The gaming device 10 reveals the indicia appearing in that selection 208*i* to be a club. The match results display 184 informs the player that there was an incorrect match. As stated before, a terminating condition will eventually occur, as indicated in FIG. 3 by diamond 72. In the example shown in FIG. 8H, the number of attempts remaining 216 is zero, therefore the termination condition is fulfilled and the gaming device 10 proceeds to calculate the final total award 148 in a manner similar to that described in relation to FIGS. 4K to 4M and the bonus round terminates. In one embodiment, an additional award or bonus award is provided for matching the number correct with the prediction.

Figure 9A:
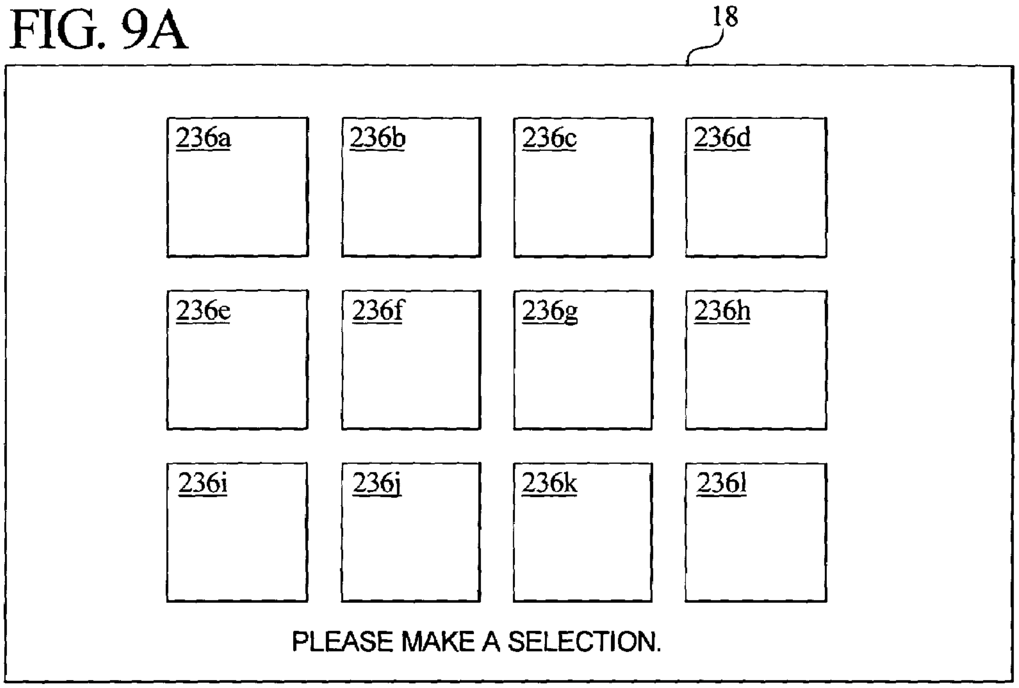
FIGS. 9A, 9B, 9C and 9D are enlarged front elevation views of the display devices of FIG. 1A or 1B illustrating an example of another embodiment of the present invention.
Figure 9B:
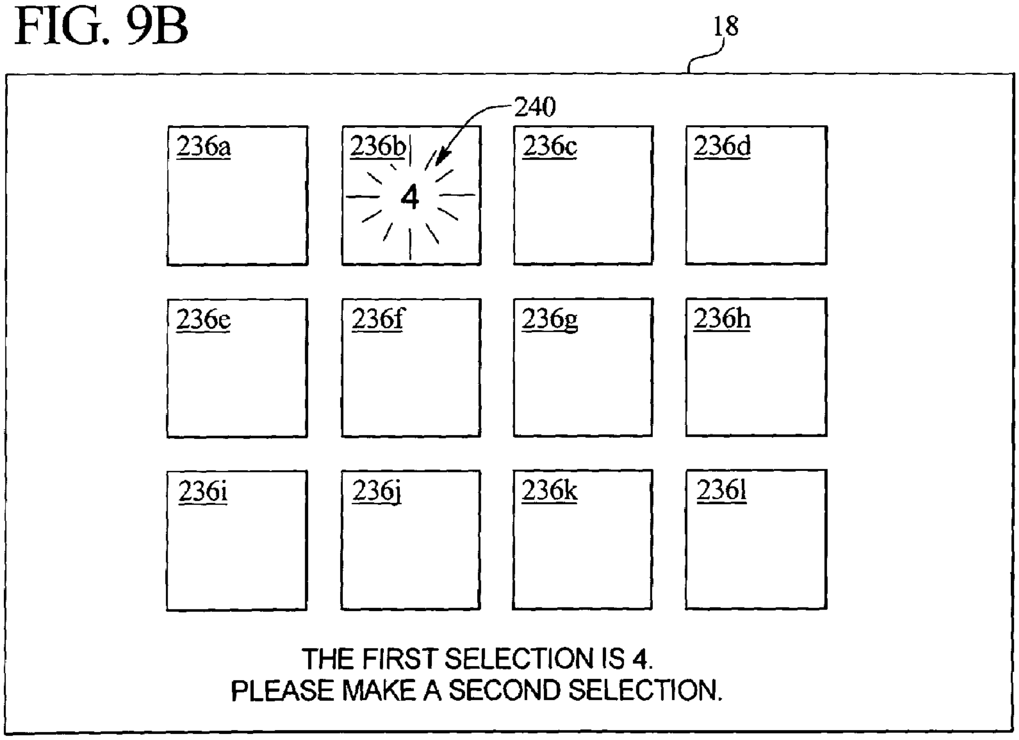
Figure 9C:
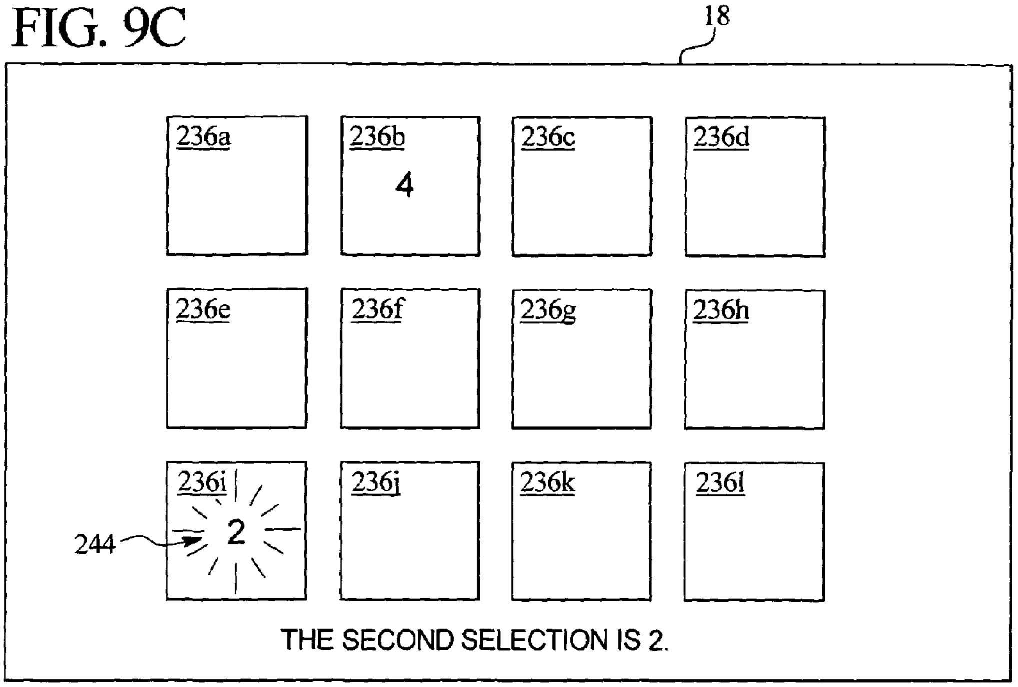
Figure 9D:
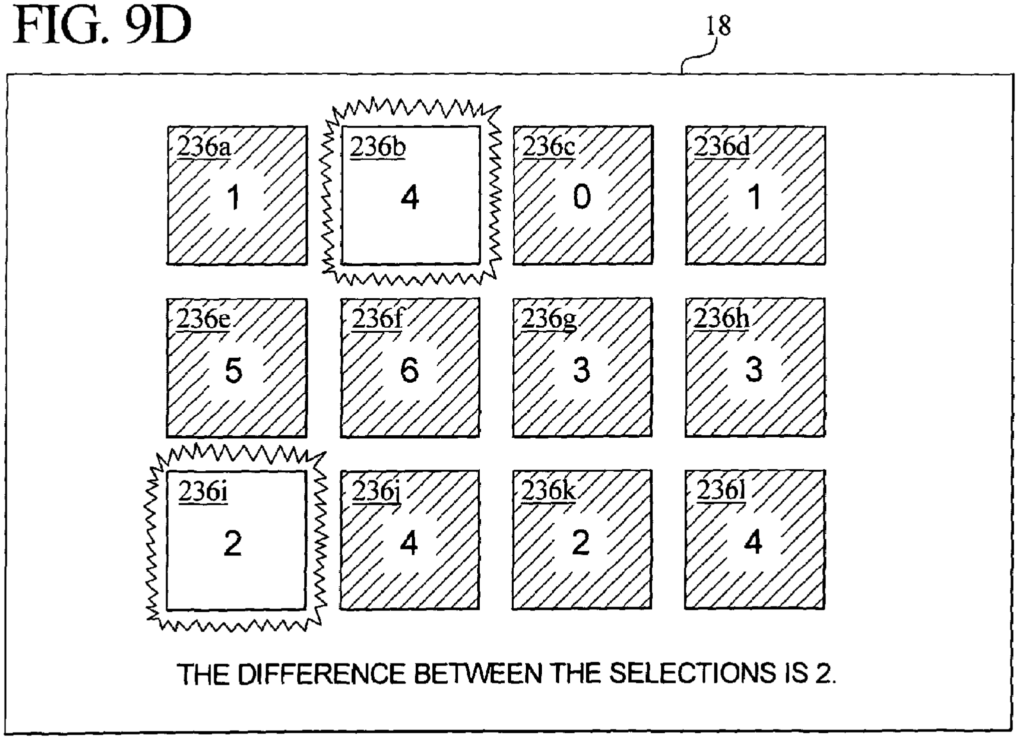

FIGS. 9A to 9D are enlarged front elevation views of the upper display devices 32 of FIGS. 1A and 1B illustrating an example of another embodiment of the present invention where two selections are made from a plurality of possible selections 236*a* to 2361. In FIG. 9A, the gaming device 10 prompts the player to make a selection. With reference to FIG. 9B, the gaming device 10 recognizes a first selection 236*b* and reveals the value of the first selection 240 to the player. The gaming device 10 them prompts the player to make a second selection. With reference to FIG. 9C, the gaming device 10 recognizes a second selection 244 and reveals the value of the second selection 244 to the player. The gaming device 10 then reveals the values of the other plurality of possible selections 236*a*, 236*c* to 236*h* and 236*j* to 236I. The gaming device 10 calculates the absolute value of the difference between the two numbers and modifies a modifier such as a multiplier in a manner similar to that described with respect to FIGS. 4K to 4L. The gaming device 10 then proceeds to calculate the final total award 148 in a manner similar to that described in relation to FIG. 4M and the bonus round terminates. It should thus be appreciated that any suitable sequences can be used to determine the first number such as the predicted number of matches and the second number such as the actual number of matches. It should also be appreciated that the present invention can include any suitable selection, determination or generation of two numbers, wherein the outcome or award is based on the absolute value of the difference between the two numbers. The numbers can be determined in any suitable manner such as based on locations or distances.

In further alternative embodiments, the values associated with the absolute value calculation need not be linear. For instance, the value zero could be associated with the absolute value of zero, the value two could be associated with the absolute value of one, the value of five could be associated with the absolute value of two, and the value of ten could be associated with the absolute value of three. Thus, the absolute value can be used to determine an award or value level.

In a further embodiment, the further the actual number is away from the predicted number, the higher the multiplier. This could also be linear or non-linear.

In a further embodiment which includes a selection game as discussed above, the prediction could be of the number of selections picked before a designated result is reached such as a termination result. It should thus be appreciated that the present invention contemplates any suitable manner of determining the numbers such as the predicted number and actual number.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of at least one processor, said gaming device comprising:

a display device; and a game operable upon a wager by a player, said at least one processor programmed to:

(a) determine a predicted number of matches, (b) cause a game sequence to be displayed to the player by the display device and to display an actual number of matches, (c) determine an absolute value of the difference between the predicted number of matches and the actual number of matches, and (d) provide an award to the player based on the absolute value of the difference between the predicted number of matches and the actual number of matches.

2. The gaming device of claim 1, wherein the predicted number of matches is selected from a group consisting of: a predetermined predicted number of matches; a randomly determined predicted number of matches; and a player determined predicted number of matches.

3. The gaming device of claim 1, which includes a plurality of potential predicted number of matches and means for enabling the player to pick one of the plurality of predicted number of matches.

4. The gaming device of claim 3, wherein the plurality of potential predicted number of matches is adapted to be displayed to the player before the player picks the predicted number of matches.

5. The gaming device of claim 3, which includes a plurality of potential multipliers, each of the potential multipliers corresponding to one of the plurality of potential predicted number of matches, wherein the award is at least in part based on the multiplier corresponding to the selected predicted number of matches.

6. The gaming device of claim 1, wherein the game sequence for determining the actual number of matches includes a matching sequence with at least one round, wherein for each round the processor is programmed to:

(a) display a question;

(b) display a plurality of answer choices;

(c) enable the player to pick one of the answer choices; and (d) reveal if the player's answer choice matches the correct answer.

7. The gaming device of claim 6, including a prize value in each round adapted to be displayed to the player for achieving a match between the player's answer and the correct answer.

8. The gaming device of claim 7, wherein the prize value in each round is related to the number of answer choices in said round.

9. The gaming device of claim 7, which indicates a consolation award for at least one incorrect match.

10. The gaming device of claim 1, wherein the game sequence for determining the actual number of matches includes a matching sequence with at least one round, wherein for each round the processor is programmed to:

(a) display a plurality of selections, each selection corresponding to an indicia;

(b) enable the player to pick a first selection;

(c) enable the player to pick a second selection; and (d) determine if the indicia of the player's first selection matches the indicia of the second selection.

11. The gaming device of claim 10, which includes a prize value adapted to be displayed to the player for achieving a match between the indicia of the player's first selection and the indicia of the player's second selection.

12. The gaming device of claim 1, which includes a multiplier and wherein the award is based on the multiplier and said absolute value.

13. The gaming device of claim 12, wherein the multiplier is reduced by the absolute value of the difference between the predicted number of matches and the actual number of matches.

14. A gaming device operable under control of at least one processor, said gaming device comprising:

a display device; and a game operable on a wager by a player, said at least one processor programmed to:

(a) determine and display a predicted number of matches, (b) determine and display an actual number of matches, (c) determine the absolute value of the difference between the predicted number of matches and the actual number of matches, and (d) provide an award to a player based on the absolute value of the difference between the predicted number of matches and the actual number of matches.

15. The gaming device of claim 14, wherein the processor is programmed to cause the display device to provide a plurality of potential predicted number of matches and enables the player to pick one of the plurality of predicted number of matches.

16. The gaming device of claim 14, wherein the processor determines the actual number of matches by:

(a) causing the display device to display a question;

(b) causing the display device to display a plurality of answer choices on the display device;

(c) enabling the player to pick one of the answer choices;

(d) revealing if the player's answer choice matches the correct answer; and (e) repeated steps (a) to (d) at least once if a terminating condition is not fulfilled.

17. The gaming device of claim 16, wherein the processor is programmed to provide a prize value to the player for achieving a match between the player's answer and the correct answer, wherein the prize value is related to the number of answer choices.

18. The gaming device of claim 14, wherein the processor determines the actual number of matches by:

(a) causing the display device to display a plurality of selections, each selection corresponding to an indicia;

(b) enabling the player to pick a first selection;

(c) enabling the player to pick a second selection;

(d) determining if the indicia of the player's first selection matches the indicia of the second selection; and (e) repeating steps (a) to (d) at least once if a terminating condition is not fulfilled.

19. The gaming device of claim 18, wherein the processor is programmed to provide a prize value to the player for achieving a match between the indicia of the player's first selection and the indicia of the player's second selection.

20. The gaming device of claim 14, wherein the processor is programmed to provide an award to a player based on a multiplier and an absolute value of the difference between the predicted number of matches and the actual number of matches.

21. The gaming device of claim 20, wherein the processor is programmed to reduce a multiplier by the absolute value of the difference between the predicted number of matches and the actual number of matches, and the award is the product of the adjusted multiplier and a sum of the prize values.

22. A gaming device operable under control of at least one processor, said gaming device comprising:

a display device; and a game operable on a wager by a player, said at least one processor programmed to:

(a) cause a game sequence to be displayed to the player by the display device to determine a predicted number of matches, the game sequence including a display of a plurality of potential predicted number of matches, a player pick of one of the plurality of predicted number of matches, and a display of the selected predicted number of matches, (b) cause a game sequence to be displayed by the display device to the player to determine an actual number of matches, the game sequence including a display of a question, a plurality of answer selections, and at least one matching attempt by the player, (c) cause a prize value to be awarded to the player for each correct match between the selected answer and the predetermined answer, (d) determine an absolute value of the difference between the predicted number of matches and the actual number of matches, (e) adjust a multiplier by the absolute value of the difference between the predicted number of matches and the actual number of matches, and (f) provide an award to the player that is the product of a sum of the prize values and the adjusted multiplier.

23. The gaming device of claim 22, wherein the multiplier is reduced by the absolute value of the difference between the predicted number of matches and the actual number of matches.

24. The gaming device of claim 22, wherein the prize value is related to the number of answer choices.

25. The gaming device of claim 22, which includes at least one consolation award provided to the player for an incorrect answer.

26. The gaming device of claim 22, which includes a plurality of potential multipliers, each of the potential multipliers corresponding to one of the plurality of potential predicted number of matches, wherein the award is modified by the multiplier corresponding to the selected predicted number of matches.

27. A gaming device operable under control of at least one processor, said gaming device comprising:

a display device; and a game operable on a wager by a player, said at least one processor programmed to:

(a) cause a game sequence to be displayed to the player by the display device and which displays a plurality of selections, each of the plurality of selections corresponding to a value, (b) enable the player to make a first pick of one of the selection, (c) enable the player to make a second pick of one of the selections, (d) determine an absolute value of the difference between a number associated with the first selection and a number associated with the second selection, and (e) provide an award to the player based on the absolute value of the difference between a number associated with first selection and a number associated with the second selection.

28. The gaming device of claim 27, wherein the award is based on a multiplier.

29. The gaming device of claim 28, wherein the multiplier is reduced by an absolute value of the difference between a number associated with first selection and a number associated with the second selection.

30. A gaming device operable under control of at least one processor, said gaming device comprising;

a display device; and a game operable upon a wager by a player, said at least one processor programmed to:

(a) determine a first number, (b) determine a second number, (c) determine an absolute value of a difference between the first number and the second number, and (d) provide an outcome to the player based on the absolute value of the difference between the first number and the second number.

31. The gaming device of claim 30, wherein the outcome is based on a multiplier.

32. The gaming device of claim 31, wherein the multiplier is reduced by the absolute value of the difference between the first number and the second number.

33. The gaming device of claim 30, wherein the outcome is selected from one of: at least one credit, an award, a prize, at least one free game or spin.

34. A method for operating a gaming device having a game operable upon a wager, said method comprising:

(a) providing a game sequence to the player to determine a predicted number of matches;

(b) providing a game sequence to determine the actual number of matches;

(c) displaying the actual number of matches;

(d) determining an absolute value of the difference between the predicted number of matches and the actual number of matches; and (e) determining an award based on the absolute value of the difference between the predicted number of matches and the actual number of matches.

35. The method of claim 34, wherein determining the predicted number of matches includes:

(a) displaying a plurality of potential predicted number of matches; and (b) enabling the player to pick one of the predicted number of matches.

36. The method of claim 34, wherein determining the predicted number of matches includes:

(a) displaying a plurality of selections;

(b) enabling the player to pick one of the selections; and (c) displaying the predicted number of matches corresponding to the player's selection.

37. The method of claim 36, wherein each selection corresponds to a different multiplier.

38. The method of claim 34, wherein determining the actual number of matches includes:

(a) displaying a question;

(b) displaying a plurality of answer choices;

(c) enabling the player to pick one of the answer choices;

(d) revealing if the player's answer choice matches the correct answer;

(e) displaying a prize value if the player's answer choice matches the correct answer; and (f) repeating steps (a) to (e) at least once if a terminating condition is not fulfilled.

39. The method of claim 38, wherein the value of the prize for each question is directly related to the number of answer choices for each question.

40. The method of claim 34, wherein determining the actual number of matches include:

(a) displaying a plurality of selections, each selection corresponding to an indicia;

(b) enabling the player to pick a first selection;

(c) enabling the player to pick a second selection;

(d) determining if the indicia of the player's first selection matches the indicia of the second selection;

(e) displaying a prize value if the player's first selection matches the player's second selection; and (f) repeating steps (a) to (e) at least once if a terminating condition is not fulfilled.

41. The method of claim 34, wherein the award based on a multiplier.

42. The method of claim 41, wherein the multiplier is adjusted by the absolute value of the difference between the predicted number of matches and the actual number of matches.

43. The method of claim 34, which is controlled through a data network.

44. The method of claim 43, wherein the data network is an internet.

45. A method for operating a gaming device having a game operable upon a wager by a player, said method comprising:

(a) displaying a plurality of selections;

(b) enabling the player to pick one of the selections;

(c) displaying a predicted number of matches corresponding to the player's selection;

(d) providing a game sequence to determine the actual number of matches;

(e) displaying the actual number of matches;

(f) determining an absolute value of a difference between the predicted number of matches and the actual number of matches: and (g) determining an award based on the absolute value of the difference between the predicted number of matches and the actual number of matches.

46. The method of claim 45, wherein determining the actual number of matches includes:

(a) displaying a question;

(b) displaying a plurality of answer choices;

(c) enabling the player to pick one of the answer choices;

(d) revealing if the player's answer choice matches the correct answer;

(e) displaying a prize value if the player's answer choice matches the correct answer; and (f) repeating steps (a) to (e) at least once if a terminating condition is not fulfilled.

47. The method of claim 46, wherein the prize value is based on the number of answer choices for said question.

48. The method of claim 45, wherein determining the actual number of matches includes:

(a) displaying a plurality of selections, each selection corresponding to some indicia;

(b) enabling the player to pick a first selection;

(c) enabling the player to pick a second selection;

(d) determining if the indicia of the player's first selection matches the indicia of the second selection;

(e) displaying a prize if the player's first selection matches the player's second selection; and (f) repeating steps (a) to (e) at least once if the terminating condition is not fulfilled.

49. The method of claim 45, wherein the award is modified by a multiplier.

50. The method of claim 49, wherein the multiplier is reduced by the absolute value of the difference between the predicted number of matches and the actual number of matches.

51. The method of claim 45, which is controlled through a data network.

52. The method of claim 51, wherein the data network is an internet.

53. A method for operating a gaming device having a game operable upon a wager by a player, the method comprising:

(a) displaying a plurality of selections;

(b) enabling the player to input a pick one of the selections;

(c) displaying the predicted number of matches corresponding to the player's picked selection;

(d) displaying a question;

(e) displaying a plurality of answer choices;

(f) enabling the player to input a pick one of the answer choices;

(g) revealing if the player's answer choice matches the correct answer;

(h) displaying a prize value if the player's answer choice matches the correct answer;

(i) repeating steps (d) to (h) until a terminating condition is fulfilled;

(j) determining an absolute value of a difference between the predicted number of matches and the actual number of matches; and (k) determining an award to provide to the player based on a multiplier, a sum of the displayed prize values, and the absolute value of the difference between the predicted number of matches and the actual number of matches.

54. The method of claim 53, wherein determining an award includes reducing the multiplier by the absolute value of the difference between the predicted number of matches and the actual number of matches, and applying the modified multiplier to the sum of the prize values.

55. The method of claim 53, which is controlled through a data network.

56. The method of claim 55, wherein the data network is an internet.

* * * * *